US007774694B2

(12) United States Patent        (10) Patent No.:    US 7,774,694 B2
Watson et al.                                      (45) Date of Patent:    Aug. 10, 2010

(54) METHOD AND SYSTEM FOR SERVER-BASED SEQUENTIAL INSERTION PROCESSING OF SPEECH RECOGNITION RESULTS

(75) Inventors: Kirk L. Watson, Austin, TX (US); Carol E. Kutryb, Cedar Park, TX (US); Joseph S. Forbes, Austin, TX (US)

(73) Assignee: 3M Innovation Properties Company, Saint Paul, MN (US)

( * ) Notice: Subject to any disclaimer, the term of this patent is extended or adjusted under 35 U.S.C. 154(b) by 986 days.

(21) Appl. No.: 10/975,762

(22) Filed: Oct. 28, 2004

(65) Prior Publication Data

US 2005/0114129 A1     May 26, 2005

Related U.S. Application Data

(63) Continuation-in-part of application No. 10/313,353, filed on Dec. 6, 2002.

(51) Int. Cl.
     *G06F 17/00*       (2006.01)
     *G06F 17/20*       (2006.01)

(52) U.S. Cl. ........................... 715/224; 715/226
(58) Field of Classification Search .......... 715/221–226
See application file for complete search history.

(56) References Cited

U.S. PATENT DOCUMENTS

| 4,975,957 | A | 12/1990 | Ichikawa et al. |
| 5,649,060 | A | 7/1997 | Ellozy et al. |
| 5,668,928 | A | 9/1997 | Groner |
| 5,799,273 | A | 8/1998 | Mitchell et al. |
| 5,960,384 | A | 9/1999 | Brash |
| 5,960,447 | A | 9/1999 | Holt et al. |
| 6,101,515 | A | * 8/2000 | Wical et al. .................. 715/234 |
| 6,122,614 | A | 9/2000 | Kahn et al. |
| 6,172,675 | B1 | 1/2001 | Ahmad et al. |
| 6,219,644 | B1 | 4/2001 | VanBuskirk |
| 6,266,635 | B1 | 7/2001 | Sneh |
| 6,298,326 | B1 | 10/2001 | Feller |
| 6,360,237 | B1 | 3/2002 | Schulz et al. |
| 6,490,553 | B2 | 12/2002 | Van Thong et al. |
| 6,513,003 | B1 | 1/2003 | Angell et al. |
| 6,535,848 | B1 | 3/2003 | Ortega et al. |

(Continued)

FOREIGN PATENT DOCUMENTS

WO      WO 98/43181     * 10/1998

OTHER PUBLICATIONS

21 Century Eloquence, L&H Dragon's Naturally Speaking Legal V5.0; Product Index; 2002; 3pp; http://www.voicerecognition.com/products/dragon/dnslegalv5.0.html.

(Continued)

*Primary Examiner*—David R Hudspeth
*Assistant Examiner*—Samuel G Neway
(74) *Attorney, Agent, or Firm*—Steven A. Bern

(57) ABSTRACT

A system and method are disclosed for sequential insertion processing of speech recognition results and, more particularly, server-based automated processing of speech recognition results. In addition, the use of formed document templates to facilitate the server-based automated sequential insertion of speech recognition results is disclosed. The formed document templates can include embedded dictionaries with related processing rules, including processing rules including positioning information.

17 Claims, 12 Drawing Sheets

U.S. PATENT DOCUMENTS

| | | |
|---|---|---|
| 6,757,739 B1 | 6/2004 | Tomm et al. |
| 6,813,603 B1 | 11/2004 | Groner et al. |
| 6,834,264 B2 | 12/2004 | Lucas et al. |
| 6,865,258 B1 | 3/2005 | Polcyn |
| 6,912,498 B2 | 6/2005 | Stevens et al. |
| 6,990,445 B2 | 1/2006 | Ky |
| 7,016,849 B2 | 3/2006 | Arnold et al. |
| 2001/0005825 A1 | 6/2001 | Engelke et al. |
| 2002/0099717 A1 | 7/2002 | Bennett |
| 2002/0116188 A1 | 8/2002 | Amir et al. |
| 2002/0143544 A1 | 10/2002 | Gschwendtner |
| 2002/0161578 A1 | 10/2002 | Saindon et al. |
| 2003/0050777 A1 | 3/2003 | Walker |
| 2003/0072013 A1 | 4/2003 | Norris et al. |
| 2004/0111265 A1 | 6/2004 | Forbes |
| 2004/0193420 A1 | 9/2004 | Kennewick et al. |
| 2005/0096910 A1 | 5/2005 | Watson et al. |
| 2005/0171762 A1 | 8/2005 | Ryan et al. |

OTHER PUBLICATIONS

Spring Medical Systems, Inc.; Using the New Office Visit Large Form—Tabs; SpringCharts™ EMR; 2001-2004; 14pp; SpringChartsEMR Tutorials V8; http://www.springmedical.com/trainingcenter/h2newovlTabs.html.

Agfa; Medical Transcription Module; QdReport; 4pp; 2004;http://agfabeint01.net.agfa.com/bu/mi/Mednet/MedNet.nsf/AllDocs/81B354E6F293D00DC1256E5200348823/$FILE/QdReport%204.0.pdf.

W3C®(MIT, ERCIM, Keio); Voice Extensible Markup Language (VoiceXML) Version 2.0; Mar. 16, 2004; 209pp; http://www.w3.org/TR/voicexml20.

Nuance Communications, Inc.; Report Templates & Power Normals Enhance Productivity; Dictaphone PowerScribe®; 2006; 2pp; http://www.dictaphone.com/products/powerscribe/psTemplates.esp.

Koninkijke Phillips Electronics N.V.; SpeechMagic™; Phillips; 2004-2006; 2pp;http://www.speedmagic.com.

Friedman, C. et al; "A General Natural-Language Text Processor for Clinical Radiology", Journal of American Medical Informatics Association, vol. 1, No. 2, Mar./Apr. 1994, pp. 161-174.

\* cited by examiner

METHOD AND SYSTEM FOR SERVER-BASED SEQUENTIAL INSERTION PROCESSING OF SPEECH RECOGNITION RESULTS

RELATED APPLICATIONS

This application is a continuation-in-part application of the following application: application Ser. No. 10/313,353 that is entitled "METHOD AND SYSTEM FOR SEQUENTIAL INSERTION OF SPEECH RECOGNITION RESULTS TO FACILITATE DEFERRED TRANSCRIPTION SERVICES," which was filed on Dec. 6, 2002, the entire text and all contents for which is hereby expressly incorporated by reference in its entirety. This application is also related to a concurrently filed application Ser. No. 10/975,928 that is entitled "FORMED DOCUMENT TEMPLATES AND RELATED METHODS AND SYSTEMS FOR AUTOMATED SEQUENTIAL INSERTION OF SPEECH RECOGNITION RESULTS," the entire text and all contents for which is hereby expressly incorporated by reference in its entirety.

TECHNICAL FIELD OF THE INVENTION

This invention relates to the use of speech recognition to facilitate transcription of dictated information and, more particularly, to the use of document templates for transcription services.

BACKGROUND

The traditional method for transcribing voice dictation does not utilize speech recognition processing to facilitate the transcription process. When traditional transcription methods are used without a template, the transcriptionist opens a blank document and starts listening to the spoken input, typing the spoken words and punctuation and adding any missing punctuation as the transcriptionist proceeds. Either from memory or by reference to a sample document, the transcriptionist manually applies formatting wherever needed and reorders the recognition results, adding and/or styling the desired section headings, to produce a finished document. Things that are typically done as part of this process are (1) typing spoken words and punctuation, (2) adding missing punctuation, (3) applying formatting, (4) adding and styling section headings, and (5) ensuring proper ordering of sections.

With the use of document templates, the traditional method for transcription becomes one in which the transcriptionist loads a template into a word processor and listens to the spoken input, typing the spoken words and punctuation and adding any missing punctuation as the transcriptionist plays back the recorded speech information. As the speaker moves from section to section of the document, the transcriptionist moves within the template, ensuring that the sections of the document appear in the desired order even if the speaker dictates the sections in a different order. The template can contain default formatting for each part of the document such that when the cursor is placed in a given location, the desired formatting for that part of the document is automatically applied. This process utilizes a speaker's spoken input to generate a finished document. The main task performed during this process is the typing of the words as spoken and the addition of punctuation, which is almost always omitted or partially omitted by the speaker. In addition to the typing and punctuation tasks, the process includes the addition of formatting and text by the transcriptionist through the use of a basis document or template. Lastly, the process includes the reordering of the document's sections into a desired order. Thus, things that are typically done as part of the traditional transcription process are (1) typing spoken words and punctuation, (2) adding missing punctuation and (3) ensuring proper ordering of sections.

More recent approaches to transcription have taken advantage of speech recognition. In recent years, speech recognition software has progressed to the extent that it can be loaded on a desktop computer system and used to directly input dictated text into an electronically displayed document. As such, speech recognition can be used in a variety of approaches to improve the efficiency of business practices. One approach is for the speaker to use speech recognition software such that the speaker's speech is converted into text while the speaker is talking. This converted speech is displayed to the speaker in electronic form so that the speaker can correct and/or format the resulting text in real-time.

An alternative approach to this direct use of speech recognition and real-time correction by the speaker is for the speech information to be recorded for deferred transcription by a transcriptionist. Such deferred transcription services free the speaker or his/her staff from the task of converting the speech information into a formatted and corrected final document, and these services can utilize transcriptionists located in remote transcription centers around the world. For example, deferred transcription services headquartered within the United States have utilized transcription centers located in remote geographic locations, such as India, where labor is reasonably skilled yet lower cost than labor within the United States. Current approaches to the use of speech recognition to facilitate deferred transcription services, however, have involved the delivery of the entire text-only results of the speech recognition process, such that a transcriptionist sees the entire text-only result file at one time.

In operation, when text-only speech recognition results are used without a template, the transcriptionist opens a document containing the text and starts listening to the spoken input, following along in the text with his/her eyes. When the transcriptionist identifies a recognition error, the transcriptionist stops the playback and corrects the recognition results. The transcriptionist stops the playback periodically to add missing punctuation to the previously played sentence or sentences. Either from memory or by reference to a sample document, the transcriptionist manually applies formatting wherever needed and reorders the recognition results, adding and/or styling the desired section headings, to produce a finished document. Things that are typically done as part of this process are (1) correcting recognition errors, (2) adding missing punctuation, (3) applying formatting, (4) adding and styling section headings, and (5) ensuring proper ordering of sections.

When text results from speech recognition are used with a template, the transcriptionist either opens two documents, one containing the text results and another containing the template, or opens one document containing both the speech recognition results and the template such that the template follows the results or vice versa. The transcriptionist can then start listening to the spoken output, following along in the text results with his/her eyes. When the transcriptionist identifies a recognition error, he/she can stop the playback and correct the recognition results. In addition, the transcriptionist can stop the playback periodically to add punctuation to the previously played sentence or sentences. Either from memory or by reference to a sample document, the transcriptionist can also manually apply formatting wherever needed. Either before, concurrent with, or after the rest of this process, therefore, the transcriptionist must arrange the recognition results into the correct parts of the template. Things that are typically done as part of this process are (1) correcting recognition errors, (2) adding missing punctuation, (3) applying formatting, and (4) ensuring proper ordering of sections.

One significant problem with the above method of applying speech recognition results to facilitate deferred transcription services by delivering the entire text-only results at once is the fact that if the transcriptionist's attention wanders even for a moment, the transcriptionist can lose his/her place in the recognition results, requiring the transcriptionist to rewind the audio and find his/her place in the document. One common approach to solving this problem is to highlight each word within the entire text of the text-only results file as the corresponding part of the audio is played. This highlighting approach, however, still suffers from inefficiencies and can be particularly difficult to utilize in a document template implementation. These difficulties are particularly evident where document templates are utilized because the transcriptionist must take the recognition results that are delivered into a document and move them into appropriate template fields.

SUMMARY OF THE INVENTION

The present invention provides a system and method for server-based sequential insertion processing of speech recognition results and, more particularly, for utilizing formed document templates to facilitate the server-based automated sequential insertion of speech recognition results.

In one embodiment, the present invention is a method for generating a transcribed data file of speech information, including providing a digital file comprising data representative of speech recognition results obtained through speech recognition processing on speech information, and sequentially inserting portions of the digital file into an electronic document to allow positioning of the portions as the portions are sequentially inserted into the document. In addition, the sequentially inserting step can further include applying automated processing rules to the portions as the portions are sequentially inserted into the document. And the sequentially inserting and applying steps can be carried out by one or more server systems to produce a plurality of resultant data files. Still further, the electronic document can be a formed document template having an embedded dictionary with related processing rules, and the embedded dictionary can include navigation tags and wherein the applying step utilizes processing rules correlated to the navigation tags if triggers associated with the navigation tags are recognized within the speech recognition results. Still further, the method can further include utilizing one or more remote stations to perform verification processing on the resultant data files. As described below, other features and variations can be implemented, if desired, and related systems can be utilized, as well.

In another embodiment, the present invention is a method for generating a transcribed data file of speech information, including generating a digital file comprising data representative of speech recognition results obtained through speech recognition processing on speech information, and positioning portions of the digital file within an electronic document as the portions are sequentially inserted into the electronic document. In addition, the method the positioning step can include automatically positioning portions of the digital file within the electronic document by applying automated processing rules to the portions as the portions are sequentially inserted into the document. In addition, the generating and positioning steps are carried out by one or more server systems to produce a plurality of resultant data files. Still further, the electronic document can be a formed document template having an embedded dictionary with related processing rules, and the dictionary can include triggers corresponding to insertion points within the document such that the applying step utilizes processing rules correlated to the insertion points when triggers are recognized within the speech recognition results. As described below, other features and variations can be implemented, if desired, and related systems can be utilized, as well.

In a further embodiment, the present invention is a method for generating a transcribed data file of speech information, including providing a digital file comprising data representative of speech recognition results obtained through speech recognition processing on speech information, obtaining an electronic document template having a data dictionary where the data dictionary including triggers and related processing rules associated with insertion points within the electronic document template, processing the digital file with one or more server systems to sequentially insert portions of the digital file into an electronic document, applying the processing rules based upon triggers recognized within the digital file as portions of the digital file are sequentially inserted into the electronic document, and generating a resultant data file having a transcribed version of the speech information within the electronic document template. In addition, the data dictionary can further include tag entries associated with the triggers where the tag entries represent text deemed to correlate to the insertion points. As described below, other features and variations can be implemented, if desired, and related systems can be utilized, as well.

In another embodiment, the present invention is a system for facilitating deferred transcription services, including one or more file servers configured to store a plurality of speech recognition results files having data representative of speech recognition results obtained through speech recognition processing on speech information, and one or more server systems configured to apply automated processing rules to the speech recognition result files as portions of the results files are sequentially inserted into electronic documents and to generate resultant data files. In addition, the file servers can be further configured to store a plurality of digital audio files representing speech information, and further comprising a speech recognition processor configured to analyze the speech information within the digital audio files to produce a plurality of speech recognition result files. As described below, other features and variations can be implemented, if desired, and related methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides a system and method for server-based sequential insertion processing of speech recognition results and, more particularly, for utilizing formed document templates to facilitate the server-based automated sequential insertion of speech recognition results.

One prior solution for the use of speech recognition results with deferred transcription is provided by the sequential insertion techniques disclosed in co-owned application Ser. No. 10/313,353, which is entitled "METHOD AND SYSTEM FOR SEQUENTIAL INSERTION OF SPEECH RECOGNITION RESULTS TO FACILITATE DEFERRED TRANSCRIPTION SERVICES," the entire text and all contents for which is hereby expressly incorporated by reference in its entirety. In this solution, the speech recognition results are analyzed as portions of the results are sequentially inserted into a document or document template. FIGS. 1A-1B and 2-6 describe example embodiments that were discussed within this prior application.

Figure 7A:
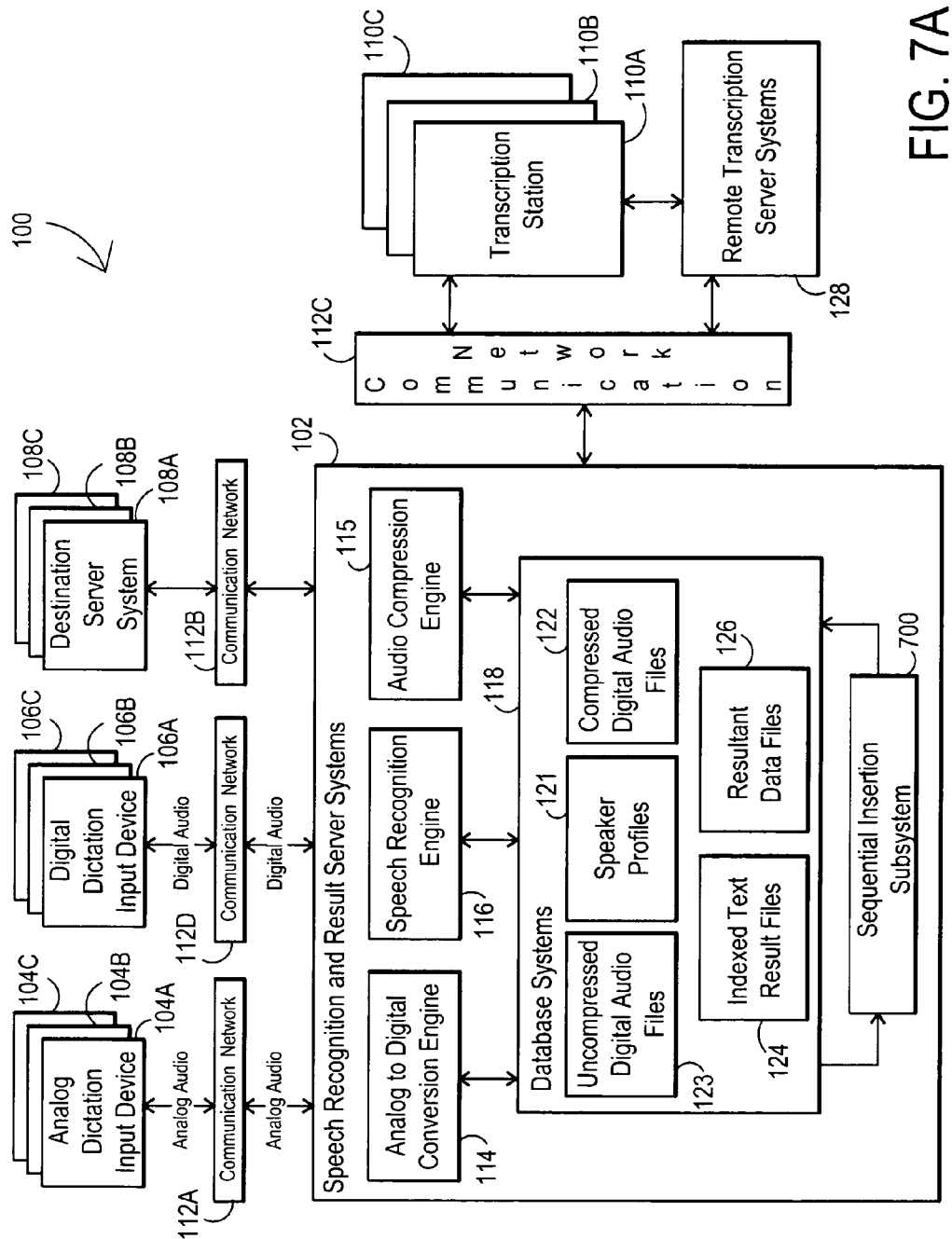
FIG. 7A is a block diagram of an embodiment for automated sequential insertion of speech recognition results in a transcription environment including a variety of systems connected through communication networks.
Figure 7B:
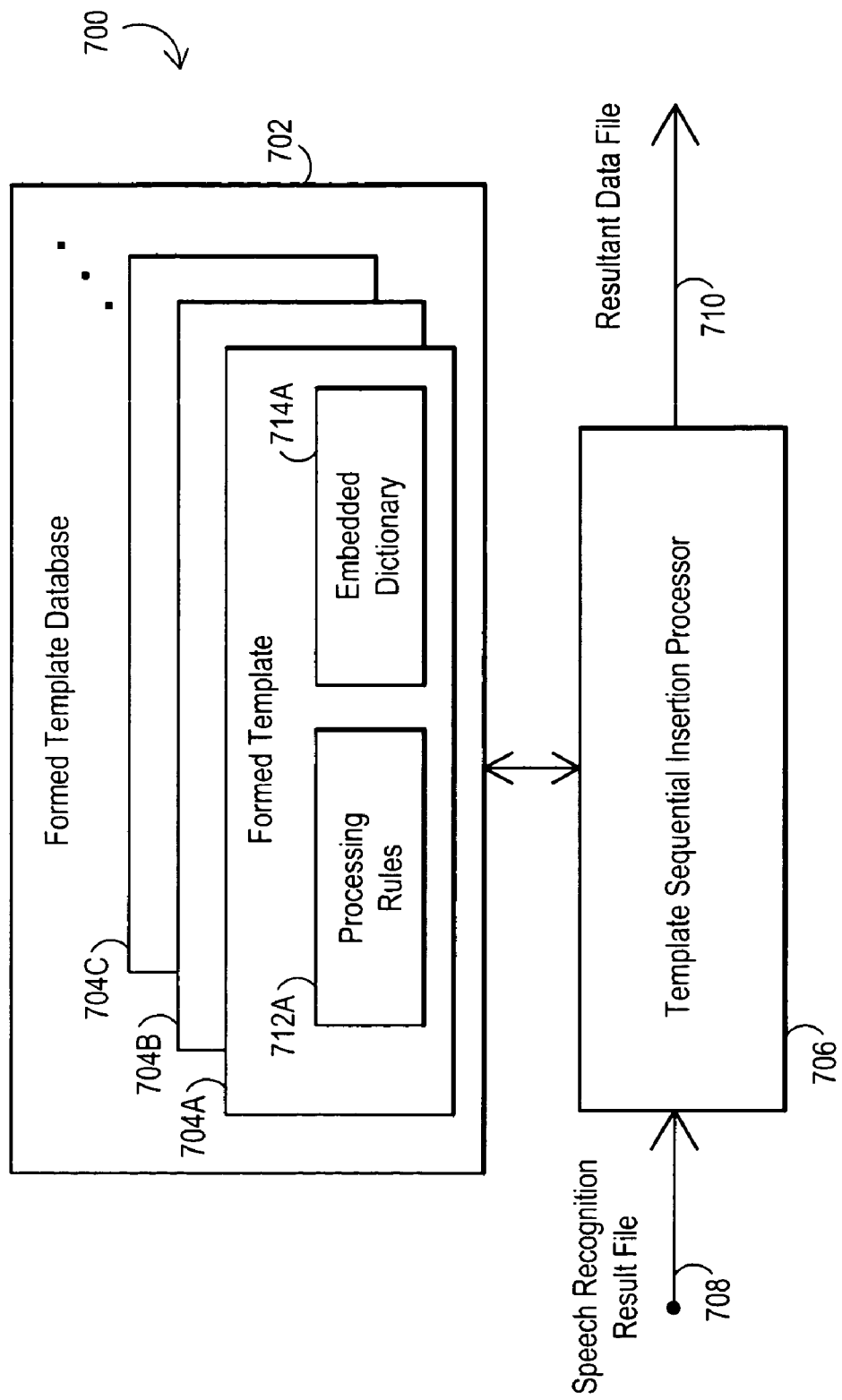
FIG. 7B is a block diagram for an automated sequential insertion subsystem utilizing formed document templates.
Figure 7C:
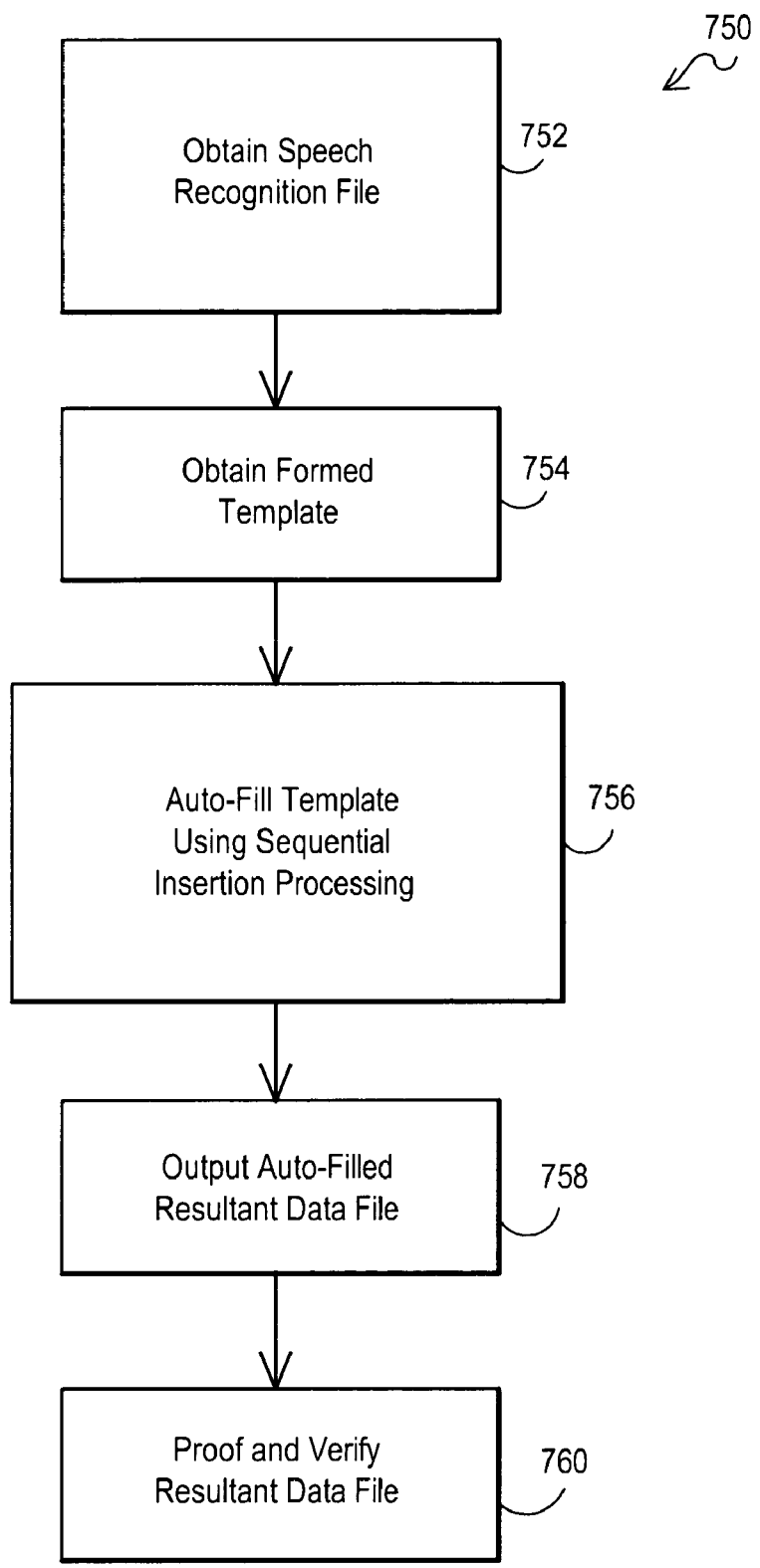
FIG. 7C is a process block diagram for generating auto-filled resultant data files utilizing formed document templates.
Figure 8A:
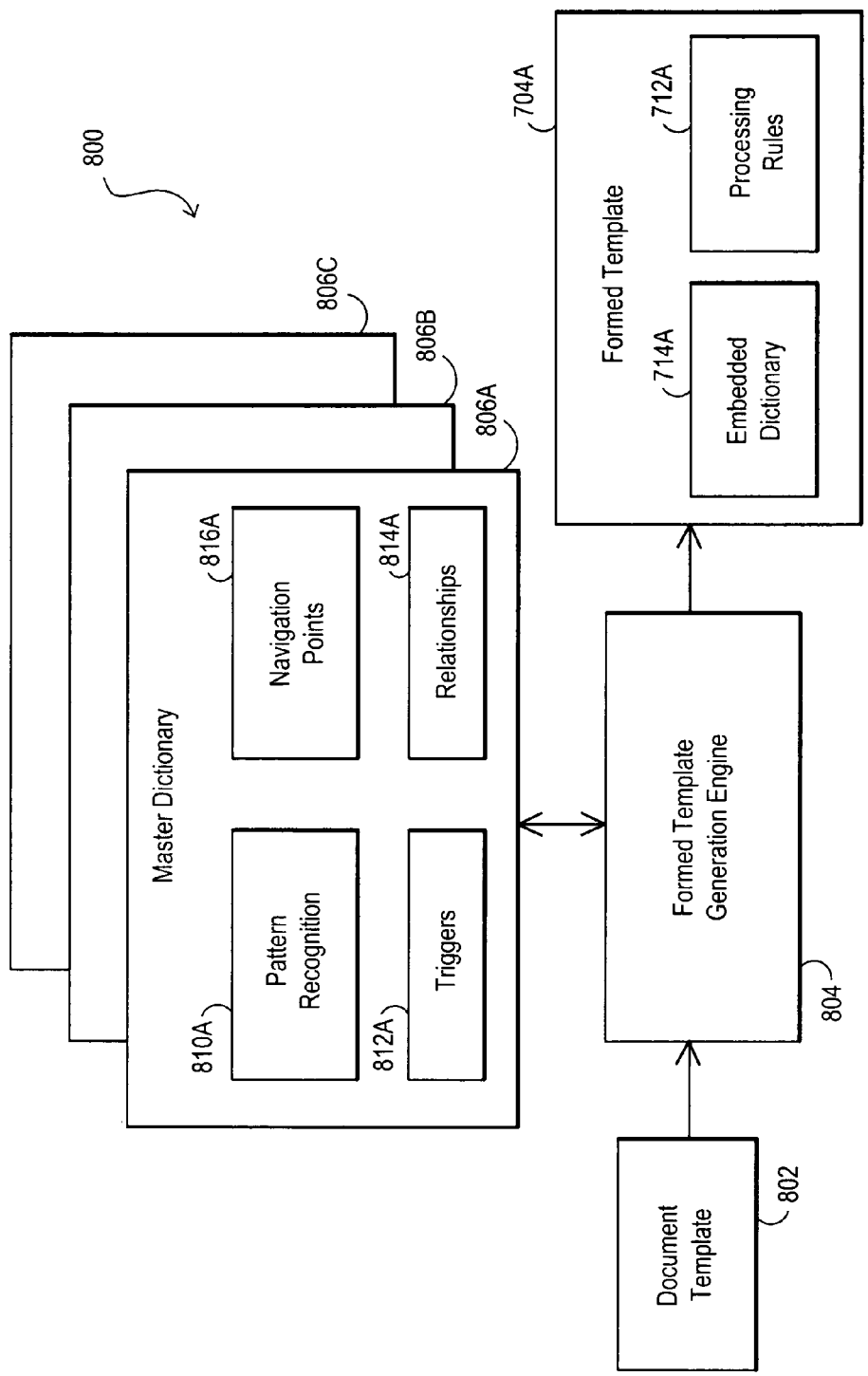
FIG. 8A is a block diagram of a system for generating formed document templates.
Figure 8B:
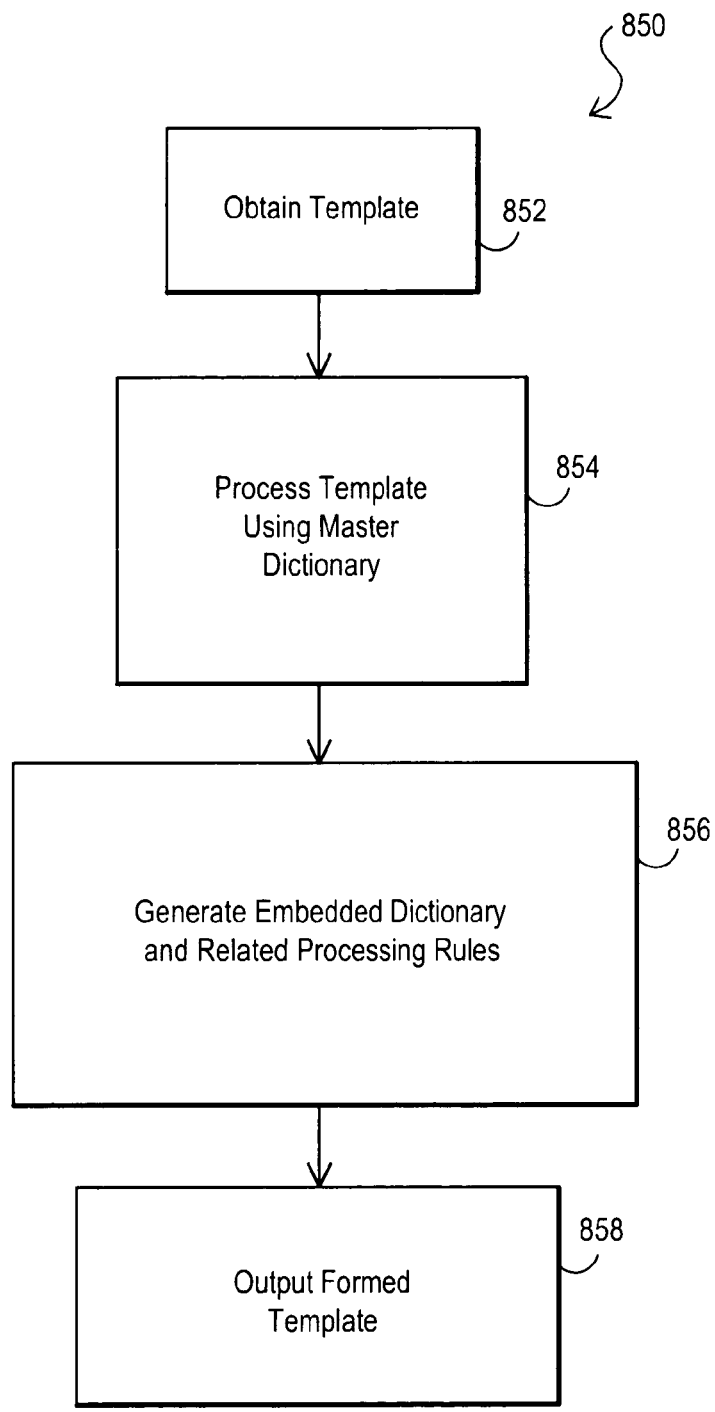
FIG. 8B is a process block diagram for processing a document template to create a formed document template with an embedded dictionary and related processing rules.

FIGS. 7A, 7B and 7C provide additional block diagrams for further example embodiments where the sequential insertion processing is performed by one or more server systems and automated processing of formed document templates can be utilized. FIGS. 8A and 8B provide example block diagrams for generating formed document templates that include embedded dictionaries and related processing rules to facilitate the automated sequential insertion processing of document templates.

As discussed in this prior application, deferred transcription services can include any of a variety of situations that could involve the use of sequential insertion of speech recognition results at a time that is different from the time at which the speech information is generated, including, for example, (1) where speech recognition is done at the same time that the speech information is generated and sequential insertion of the speech recognition results is used at a later time to provide deferred correction of the speech recognition results, and (2) where speech recognition is done at a subsequent time to the time that the speech information is generated and sequential insertion of the speech recognition results is used at a still later time to provide deferred correction of the speech recognition results. In addition, it is noted that speech recognition results can include any of a variety of data files that include data representing the words, phrases and/or other results that were recognized through the speech recognition process, whether or not the data file represents the initial result file output of a speech recognition engine or some modified or processed version of this information. Furthermore, it should be understood that the transcriptionists described below can be any user that desires to take advantage of the sequential insertion of speech recognition results according to the present invention.

Figure 1A:
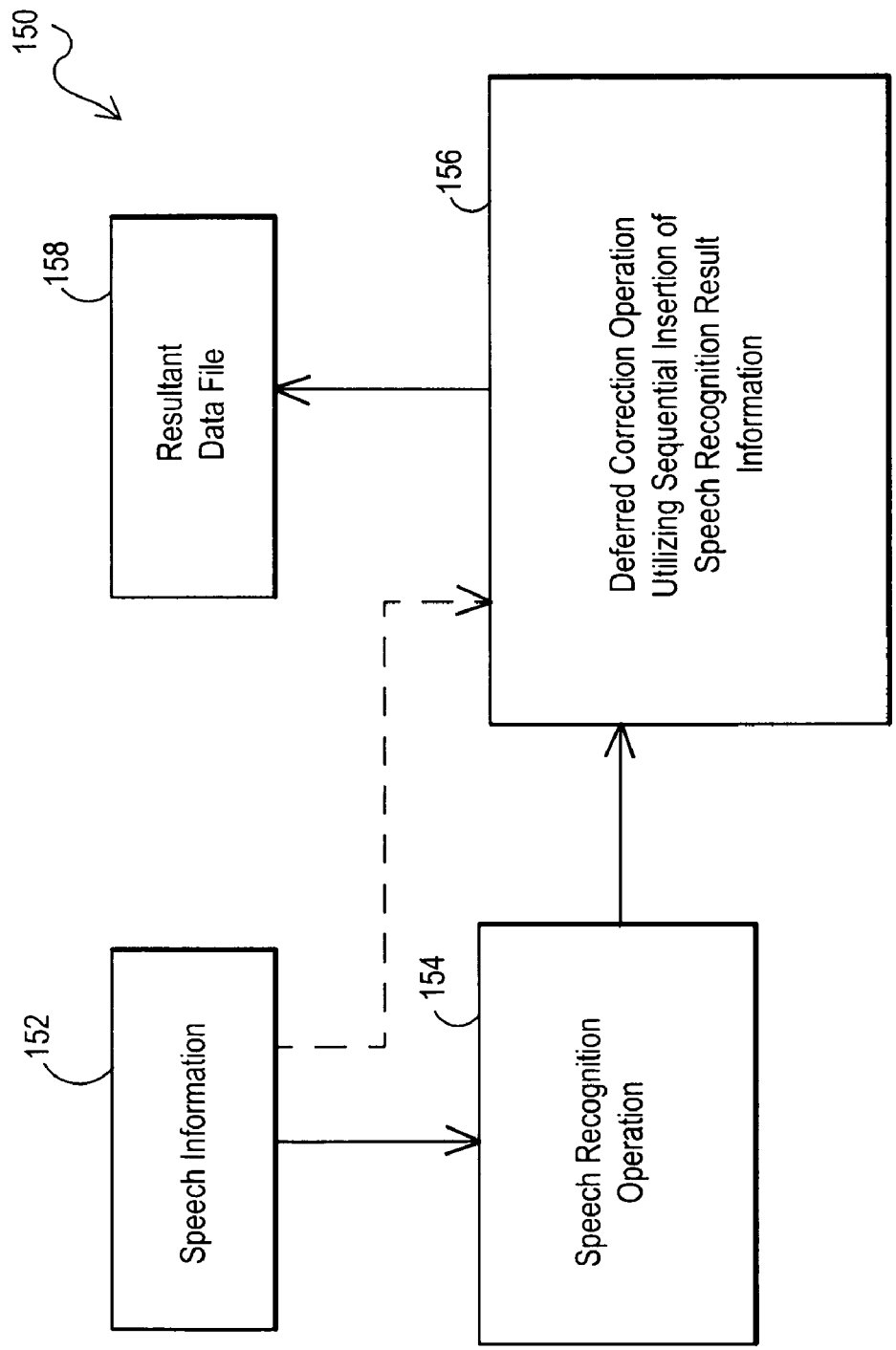
FIG. 1A is block diagram for a deferred transcription environment utilizing sequential insertion according to the present invention.

FIG. 1A is block diagram for a deferred transcription environment 150 utilizing sequential insertion according to the present invention. In the deferred transcription environment 150 shown, a speech recognition operation 154 is first performed on speech information 152. The speech recognition results are then provided to block 156 for a deferred correction operation utilizing the sequential insertion of speech recognition result information. As represented by the dotted line between block 152 and block 156, if desired, speech information 152 can also be utilized in performing the deferred correction operation of block 156. The final resultant data file 158 represents that resulting product of the deferred correction operation 156. In a general sense, therefore, the present invention facilitates deferred transcription services by utilizing results files from speech recognition processes to sequentially insert speech recognition results or display speech recognition results to a transcriptionist so that the transcriptionist can sequentially correct and format those results as needed. In addition, if audio playback is utilized, the sequential insertion can be synchronized with the audio playback so that the transcriptionist sequentially sees the speech recognition results synchronized with the corresponding audio speech information as it is played back. As discussed below, there are a wide variety of architectures and environments for implementing and utilizing the sequential insertion of speech recognition results to facilitate deferred transcription services according to the present invention.

In one general example utilizing sequential insertion with synchronized audio playback, the synchronization approach works by utilizing an audio playback component that can be polled for its current position within the audio playback and/or for other playback related information. During playback, for example, the transcription station used by the transcriptionist can periodically poll the audio playback component for its current position. At each polling event, any results unit in the time-indexed results that has a position between the current position and the position of the next expected polling event is inserted into the document at the current cursor position and the cursor is advanced to the end of the last inserted word. It is noted that the maximum frequency of the polling is likely to be dependent on the resolution offered by the audio playback component's response to a polling of its current position. It is further noted that the synchronization of the insertion of the text with the current position within the audio playback may be implemented as described above or it may be implemented following a variety of different rules, as desired. For example, the text may be inserted after the corresponding audio has played by inserting words at each polling whose positions are between the current polling position and the previous polling position. Further variations may also be achieved by adding or subtracting an interval to or from the current position within the audio or the position of the results units, resulting in a fixed or an adjustable "lag" or "lead" time between the audio playback and the insertion of corresponding text.

Using this approach, the transcriptionist can load a template into a word processor, place the cursor at the start of the document, and begin playback. As the transcriptionist listens to the spoken input, the speech recognition results are inserted into the document. When the transcriptionist identifies a recognition error, the transcriptionist stops the playback and corrects the recognition error. The transcriptionist stops the playback periodically to add missing punctuation. When the speaker moves from section to section of the document, the transcriptionist stops playback, deletes the results indicating to move to a different section, moves the cursor to the desired section, and restarts playback. The template contains default formatting for each part of the document such that when the cursor is placed in a given location, the desired formatting for that part of the document is automatically applied. Things that are typically done as part of this process include (1) correcting recognition errors, (2) adding missing punctuation and (3) ensuring proper ordering of sections. In practice, therefore, the sequential insertion of speech recognition results of the present invention tends to enhance the traditional approach for deferred transcription rather than replacing it with the insertion of block text-only results from speech recognition processing.

Figure 1B:
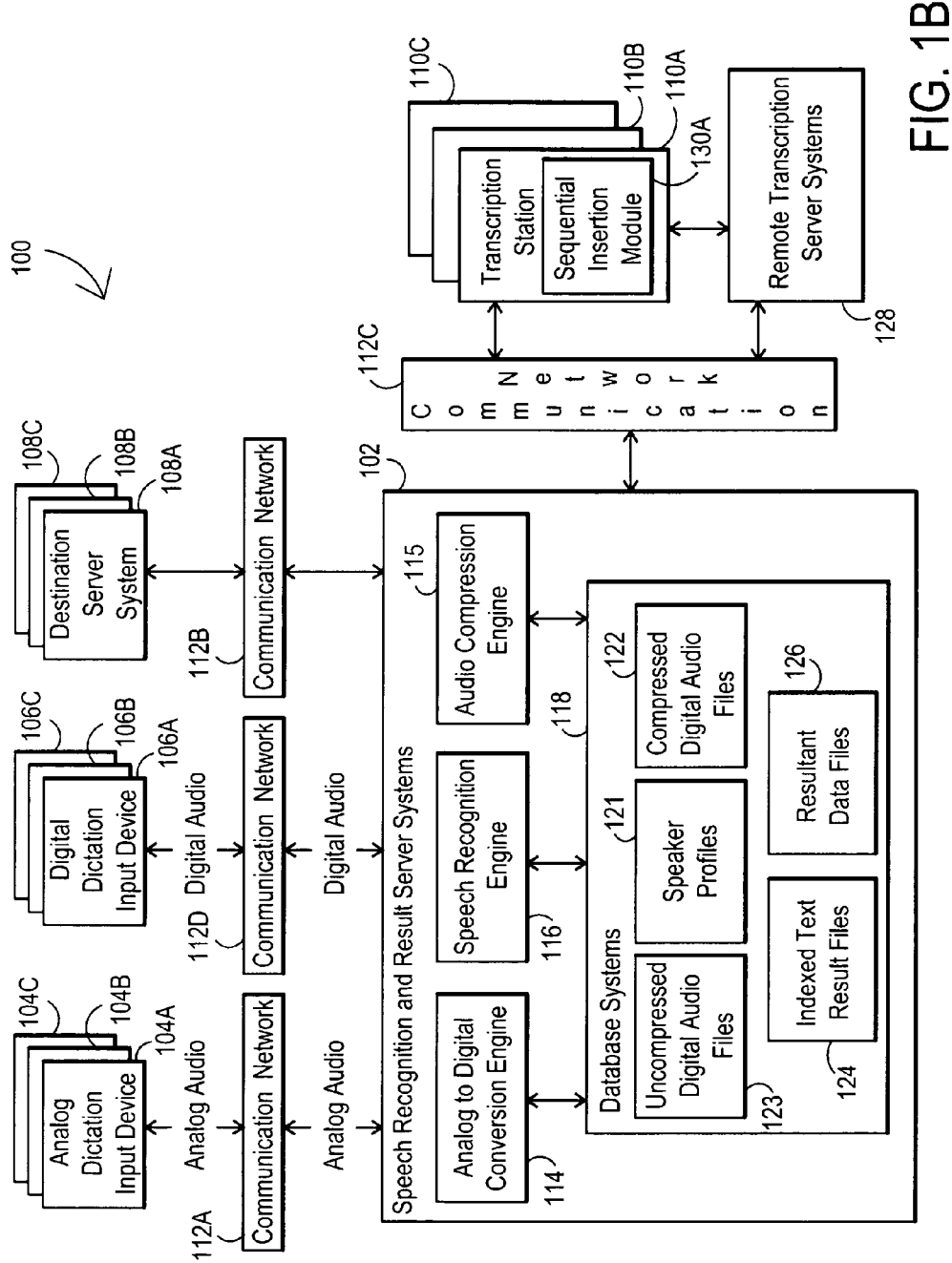
FIG. 1B is a block diagram of an embodiment for a sequential insertion transcription environment including a variety of systems connected through communication networks.
Figure 2:
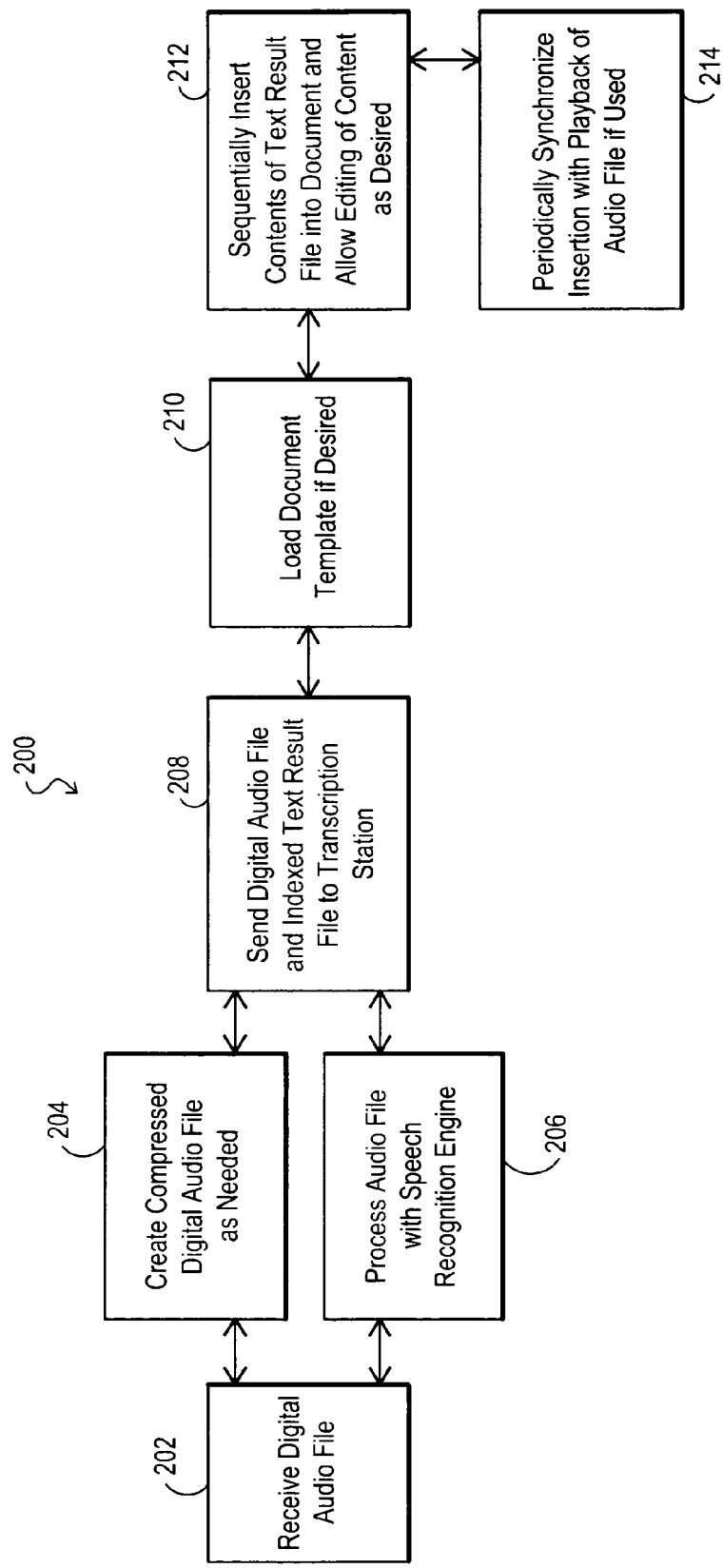
FIG. 2 is a block flow diagram of an embodiment for operations where compressed audio files and speech recognition results are utilized to generate resultant content through sequential insertion of the result information.
Figure 3:
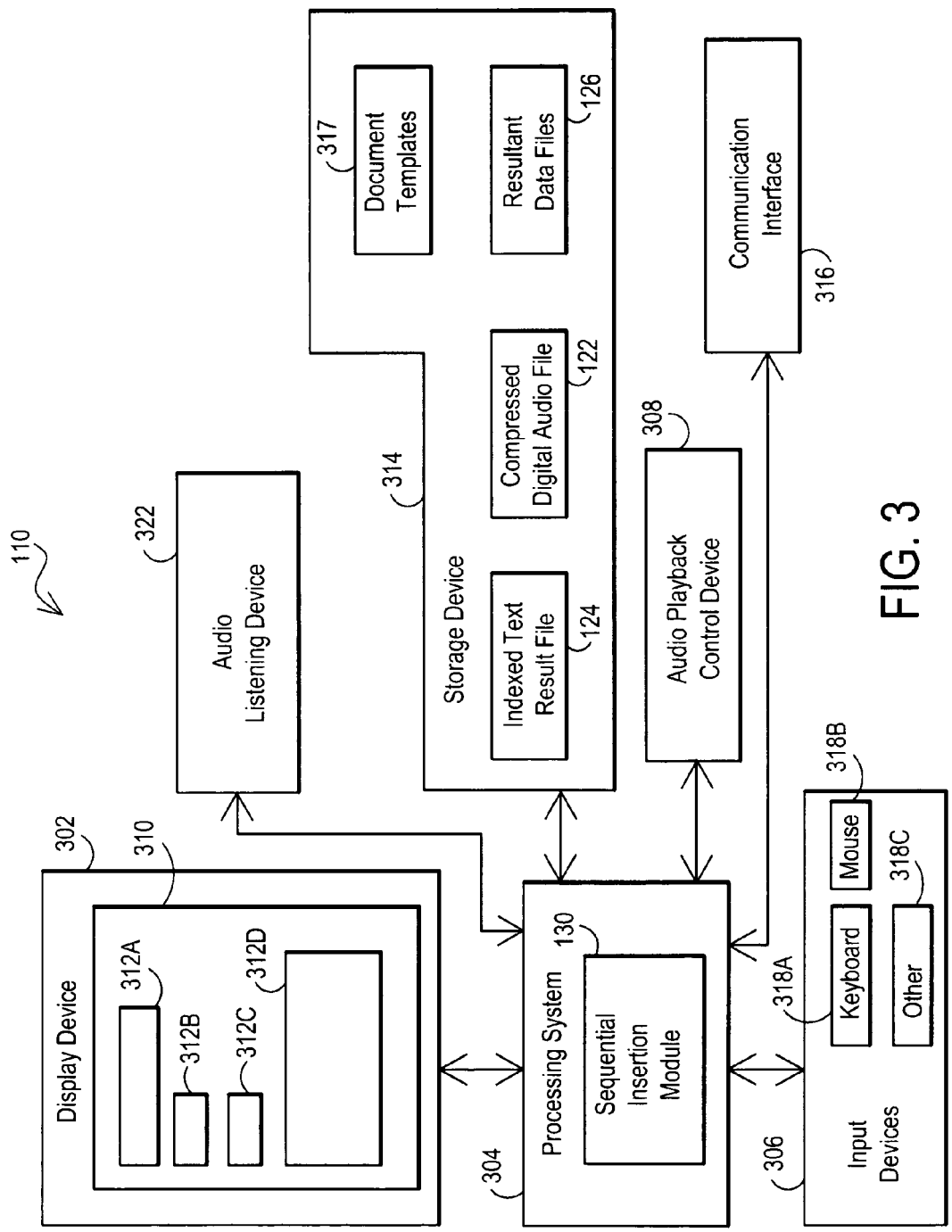
FIG. 3 is a block diagram of an embodiment for a transcription station including a processing system operating a sequential insertion module.
Figure 4:
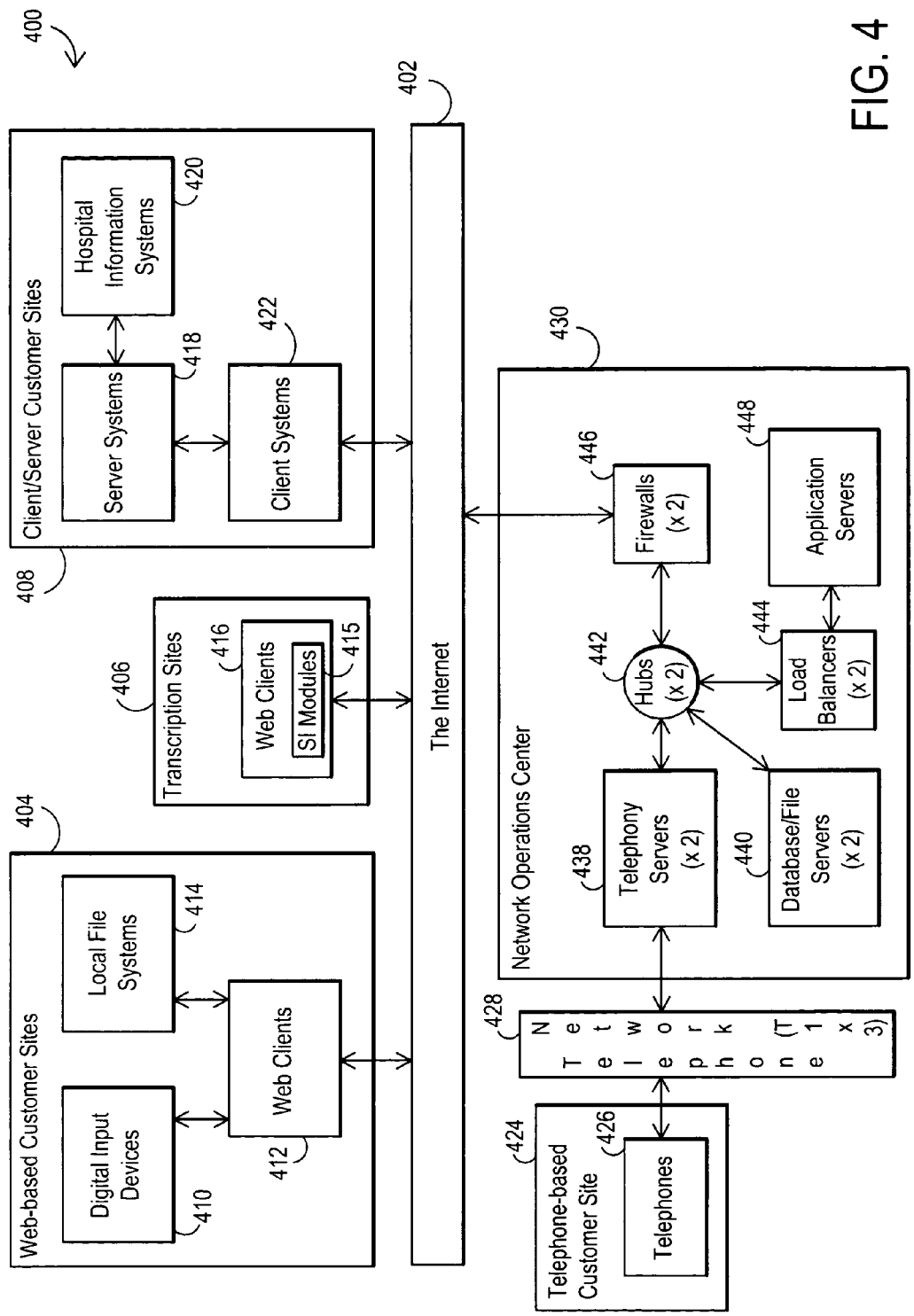
FIG. 4 is a block diagram of an embodiment for a medical transcription environment in which the sequential insertion module of the present invention can be utilized.
Figure 5:
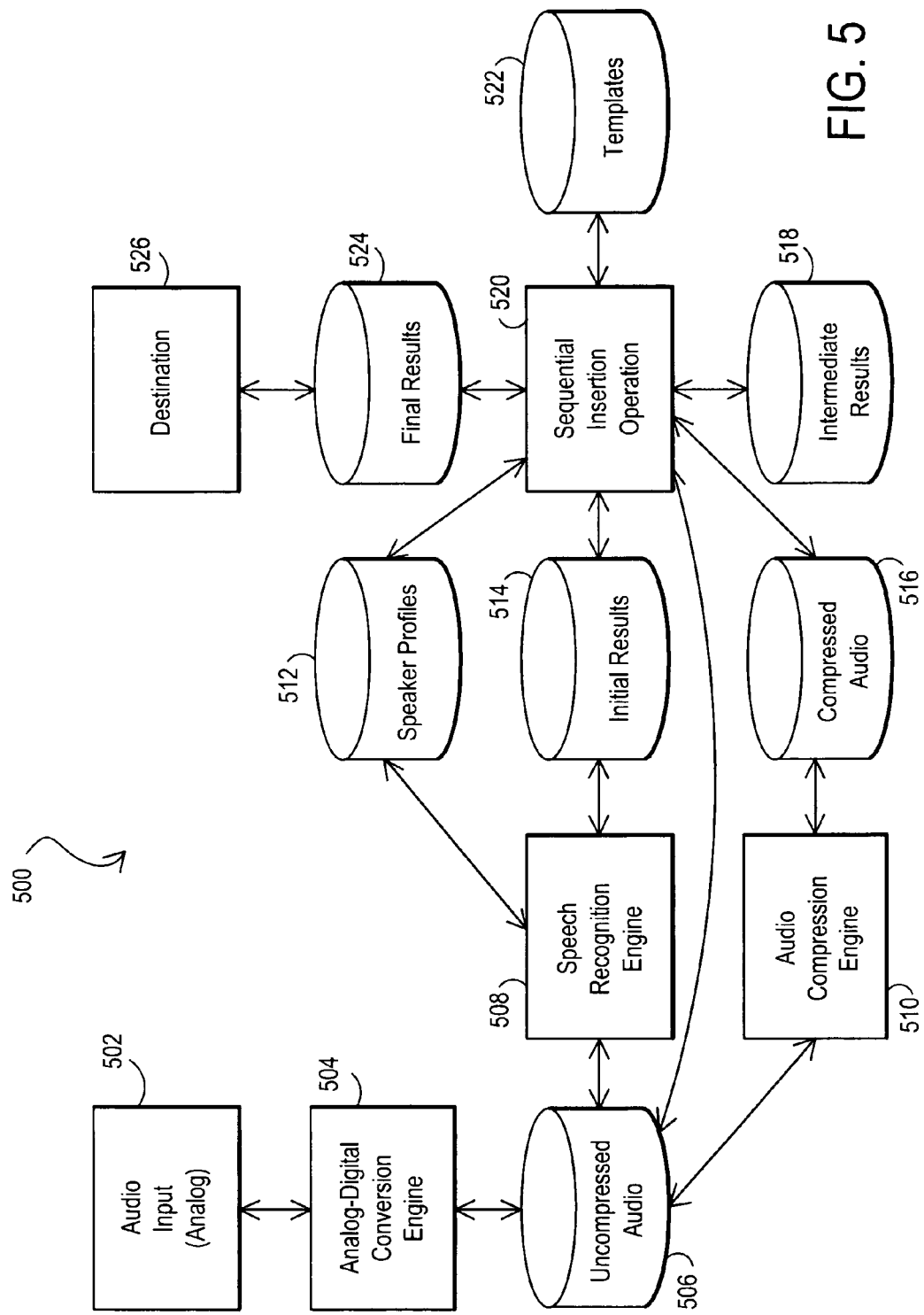
FIG. 5 is a block diagram for an additional embodiment for utilizing sequential insertion of speech recognition results.
Figure 6:
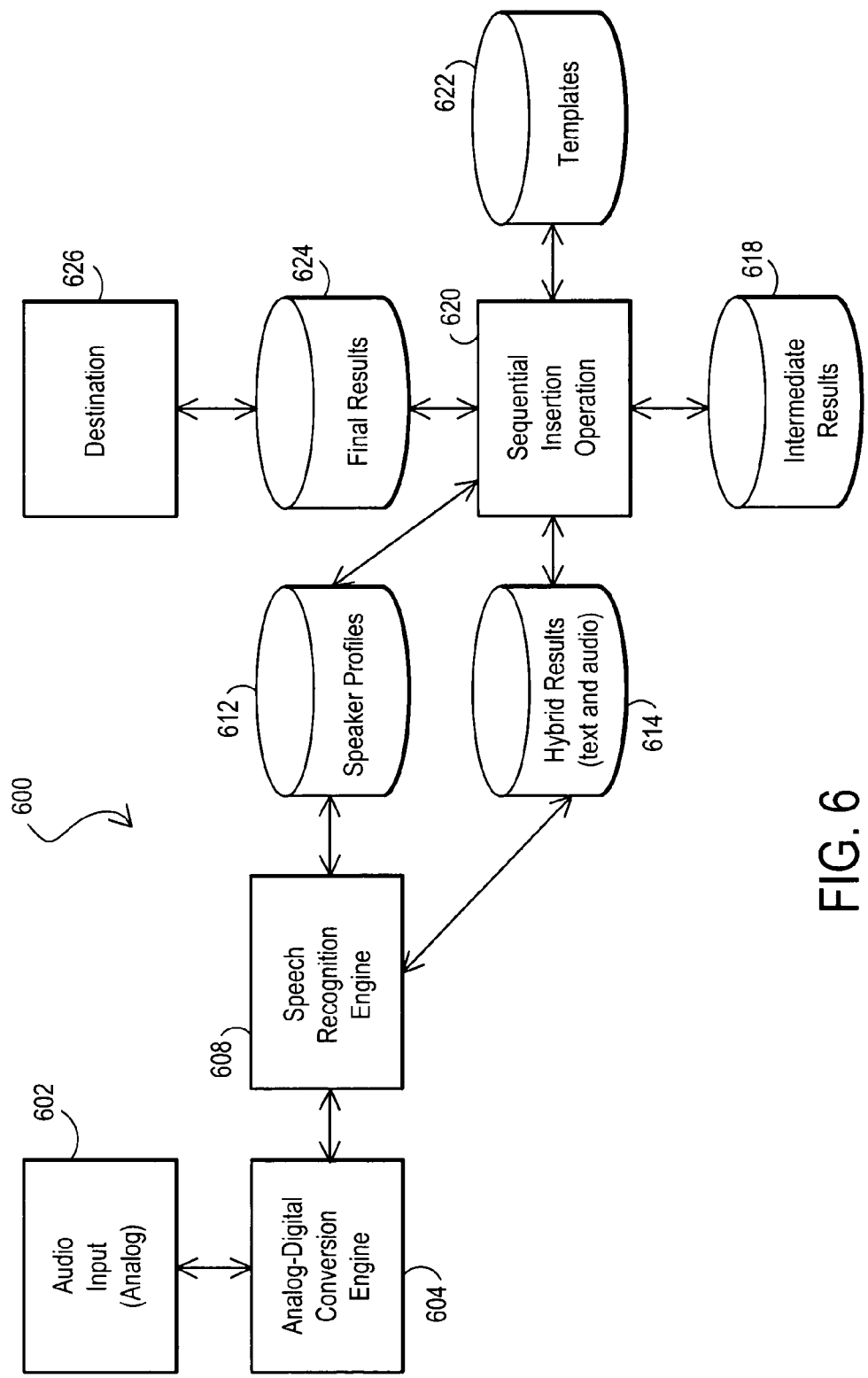
FIG. 6 is a block diagram for a additional embodiment for utilizing the sequential insertion of speech recognition results where the speech recognition results file is in a different format from a time-indexed text file.

FIG. 1B provides a block diagram of an embodiment for a transcription environment 100 in which voice dictation, speech recognition and deferred transcription are accomplished by different systems that are connected together through one or more communication networks. FIGS. 2-3 provide a flow diagram and a block diagram that describe in more detail the sequential insertion of speech recognition results for deferred transcription. FIG. 4 provides an additional embodiment for a medical transcription environment. And FIGS. 5-6 provide additional example implementations for the use of sequential insertion of speech recognition results.

Looking first to FIG. 1B, a deferred transcription environment 100 is depicted. In this embodiment, speech information is generated by a speaker through any one of a plurality of analog dictation input devices 104A, 104B, 104C, etc. and/or any one of a plurality of digital dictation input devices 106A, 106B, 106C etc. The analog dictation input devices 104A, 104B, 104C represent those devices, such as telephone or an analog (e.g., micro-cassette) recording device that is hooked up to a telephone line, that can provide analog audio information through communication network 112A to speech recognition and result server systems 102. This audio information can be converted to digital information through digital-to-analog conversion engine 114. Audio compression engine 115 can be used to compress digital audio information into compressed digital audio files. The compressed and uncompressed digital audio files can be stored as part of databases 122 and 123 within database systems 118. One example of the use of a dictation input device 104 would be remote dictation, such as where a speaker uses a telephone to call into the speech recognition and result server systems 102 which then stores and processes the audio speech information provided by the speaker. Other techniques and devices for providing analog audio information to server systems 102 could also be utilized, as desired. It is noted that the communication network 112A can be any network capable of connecting analog devices 104A, 104B and 104C. For example, this network 112A may include a telephone network that can be used to communicate with end user telephone or analog systems.

The digital dictation devices 106A, 106B, 106C represent devices that provide digital audio information through communication network 112D to speech recognition and result server systems 102. This digital audio information generated by the digital dictation devices 106A, 106B, 106C can be compressed or uncompressed digital audio files, which can be communicated through network 112D and stored as part of databases 122 and 123 within database systems 118. In addition, if uncompressed digital audio files are generated by digital dictation devices 106A, 106B, 106C, these files could be compressed so that compressed digital audio files are communicated through the network 112D, thereby reducing bandwidth requirements. One example of a digital dictation device 106 would be dictation into a digital recorder or through a microphone connected to a computer such that the speech information is stored as a compressed or uncompressed digital audio file. This digital audio file can then be communicated by the digital recorder or computer through communication network 112D to the server systems 102 for further processing. The communication network 112D can be any variety of wired or wireless network connections through which communications can occur, and the communication network 112D can include the Internet, an internal company intranet, a local area network (LAN), a wide area network (WAN), a wireless network, a home network or any other system that provides communication connections between electronic systems.

The speech recognition and result server systems 102 represent a server-based embodiment for processing speech information for the purpose of deferred transcription services. The server systems 102 can be implemented, for example, as one or more computer systems with hardware and software systems that accomplish the desired analog or digital speech processing. As indicated above, the server systems 102 can receive speech information as analog audio information or digital audio information. In addition to being communicated through communication networks 112A and 112D, this audio information could also be provided to and loaded into the server systems in other ways, for example, through the physical mailing of analog or digital data files recorded onto a variety of media, such as analog tape, digital tape, CDROMs, hard disks, floppy disks or any other media, as desired. Once obtained, the information from this media can be loaded into the server systems 102 for processing. The analog-to-digital conversion engine 114 provides the ability to convert analog audio information into digital audio files, and the audio compression engine 115 provides the ability to compress digital audio files into compressed files. The speech recognition engine 116 provides the ability to convert digital audio information into text files that correspond to the spoken words in the recorded audio information and provide the ability to create time-index data associated with the spoken words. As noted above, in addition to time-indexed text files, other file formats may be used for the speech recognition results files, and different speech recognition engines currently use different result file formats. The database systems 118 represent one or more databases that can be utilized to facilitate the operations of the server systems 102. As depicted, database systems 118 include speaker profiles 121 that can be used by the speech recognition engine 116, compressed digital audio files 122, uncompressed digital audio files 123, indexed text result files 124, and resultant data files 126. The resultant data files 126 represent the transcribed and edited documents that result from the deferred transcription process.

To accomplish the deferred transcription of speech information, the embodiment depicted in FIG. 1B utilizes transcription stations 110A, 110B, 110C, etc. which are typically located at one or more remote transcription sites at geographic locations that are different from the geographic location for the speech recognition and result server systems 102. However, it is noted, that the server systems 102 and the transcription stations 110A, 110B and 110C could be located at the same geographic location as the server systems 102, if desired. The server systems 102 provides uncompressed and/or compressed digital audio files and indexed text result files to the transcription stations 110A, 110B and 110C through communication interface 112C. The transcription stations 110A, 110B and 110C include sequential insertion modules 130A, etc. that provide for the sequential insertion of the contents of the indexed text results, as discussed in more detail below. Remote transcription server systems 128 can also be utilized at each transcription site, if desired, to receive information from the server systems 102 and to communicate information to and from transcription stations 110A, 110B and 110C. The resultant documents created from the deferred transcription are communicated from the transcription stations 110A, 110B and 110C back to the server systems 102 through communication interface 112C. These resultant documents can be stored as part of the resultant data files database 126. It is noted that the speech recognition engine 116 could be implemented as part of the transcription stations 110A, 110B and 110C or as part of the remote transcription server systems 128, if such an implementation were desired.

The destination server systems 108A, 108B, 108C, etc. represent systems that ultimately receive the resultant documents or data from the deferred transcription process. If desired, these systems can be the same systems that are used to generate the audio information in the first place, such as digital dictation devices 106A, 106B, 106C, etc. These systems can also be other repositories of information. For example, in the medical transcription field, it is often the case that medical records or information must be dictated, transcribed and then sent to some entity for storage or further processing. The server systems 102, therefore, can be configured to send the resultant data files to the destination server systems 108A, 108B, 108C, etc. through the communication interface 112B. It is again noted that although FIG. 1B depicts the destination server systems 108A, 108B, 108C, etc. as separate systems within the environment 100, they can be combined with other portions of the environment 100, as desired.

As with communication interface 112D, communication interfaces 112B and 112C can be can be any variety of wired or wireless network connections through communications can occur, and the communication network 112A can include the Internet, an internal company intranet, a local area network (LAN), a wide area network (WAN), a wireless network, a home network or any other system that provides communication connections between electronic systems. It is also noted that communication systems 112B, 112C and 112D can represent the same network, such as the Internet. or can be part of the same network. For example, where each of these networks include the public Internet, then each of these communication networks are part of the same overall network. In such a case, all of the different systems within the environment 100 can communicate with each other. If desired, for example, the transcription stations 110A, 110B, 110C, etc. could communicate directly with the destination server systems 108A, 108B, 108C, etc. and/or with the dictation devices 104A, 104B, 104C, etc. and 106A, 106B, 106C, etc. In short, depending upon the implementation desired, the communication networks 112A, 112B, 112C and 112D can be set up to accommodate the desired communication capabilities.

FIG. 2 is a block flow diagram 200 of an embodiment for operations where audio files and speech recognition results are utilized to generate resultant content though sequential insertion of result information. In block 202, the digital audio files are received. In block 204, if desired or needed, a compressed digital audio file is generated. It is noted that if the compressed digital audio file from block 204 is to be used for synchronized playback with respect to the speech recognition results, the compressed digital audio file should be made time-true to the uncompressed audio file that is fed to the speech recognition engine in block 206. In block 206, the uncompressed audio files are processed with a speech recognition engine to generate result data, such as a time-indexed text file. It is further noted that compressed digital audio files can also be used for speech recognition processing, if desired.

Set forth below are portions of an example speech recognition result file that has been configured to be an XML-formatted time-indexed text file. The portions below are example excerpts from speech recognition results that could be created, for example, using the IBM VIAVOICE speech recognition engine. The recognized text below represents a portion of an example doctor's dictation of a medical record report or SOAP note, in which patient information is followed by sections having the headings Subjective, Objective, Assessment and Plan. SOAP notes and variations thereof are examples of well known medical reporting formats. Only portions of an example SOAP note report have been included below, and the "***" designation represent sections of the results that have been left out and would include additional information for the dictated report.

Within this example speech recognition results file, each word includes text information (TEXT) and time index information including a start time marker (STIME) and an end time marker (ETIME). For example, with respect to the work "Karen," the text is "Karen," the start time is "1810," and the end time is "2180." It is noted that the time index information is typically dependent upon the resolution provided by the speech recognition software. In the example below, the time index information is kept to the $1000^{th}$ of a second. Thus, with respect to the word "Karen," the time lapsed for this word to be spoken is 0.370 seconds. It is noted that time-indexed results files, if utilized, can be of any desired format and resolution, as desired. Thus, it should be understood that the format below is included as only one example format for a time-indexed result file. It is again further noted that other speech recognition result file formats could also be used, such as results files that combine text and audio information, without departing form the sequential insertion feature of the present invention.

```
<?xml version="1.0" encoding="ISO-8859-1"?>
<ASRRESULTS version="1.0">
    <HEADER>
        <TIME>2002-08-21 16:55:47</TIME>
        <USER>0000162</USER>
        <ENROLLID>0006</ENROLLID>
        <TASKID>ctelmdus</TASKID>
    </HEADER>
    <WORDS>
        <WORD>
            <TEXT>Karen </TEXT>
            <STIME>1810</STIME>
            <ETIME>2180</ETIME>
        </WORD>
```

```
<WORD>
    <TEXT>Jones </TEXT>
    <STIME>2180</STIME>
    <ETIME>2670</ETIME>
</WORD>
        ***
<WORD>
    <TEXT>SUBJECTIVE </TEXT>
    <STIME>12400</STIME>
    <ETIME>13140</ETIME>
</WORD>
<WORD>
    <TEXT>Karen </TEXT>
    <STIME>14160</STIME>
    <ETIME>14490</ETIME>
</WORD>
<WORD>
    <TEXT>is </TEXT>
    <STIME>14490</STIME>
    <ETIME>14610</ETIME>
</WORD>
<WORD>
    <TEXT>an </TEXT>
    <STIME>14610</STIME>
    <ETIME>14670</ETIME>
</WORD>
<WORD>
    <TEXT>18</TEXT>
    <STIME>14670</STIME>
    <ETIME>15140</ETIME>
</WORD>
<WORD>
    <TEXT>-year-old </TEXT>
    <STIME>15140</STIME>
    <ETIME>15470</ETIME>
</WORD>
<WORD>
    <TEXT>female </TEXT>
    <STIME>15470</STIME>
    <ETIME>15920</ETIME>
</WORD>
<WORD>
    <TEXT>who </TEXT>
    <STIME>15920</STIME>
    <ETIME>15980</ETIME>
</WORD>
<WORD>
    <TEXT>came </TEXT>
    <STIME>15980</STIME>
    <ETIME>16230</ETIME>
</WORD>
<WORD>
    <TEXT>in </TEXT>
    <STIME>16230</STIME>
    <ETIME>16410</ETIME>
</WORD>
<WORD>
    <TEXT>for </TEXT>
    <STIME>16410</STIME>
    <ETIME>16670</ETIME>
</WORD>
<WORD>
    <TEXT>a possible </TEXT>
    <STIME>16670</STIME>
    <ETIME>17130</ETIME>
</WORD>
<WORD>
    <TEXT>pneumonia</TEXT>
    <STIME>17130</STIME>
    <ETIME>17660</ETIME>
</WORD>
<WORD>
    <TEXT>. </TEXT>
    <STIME>18520</STIME>
    <ETIME>18990</ETIME>
</WORD>
        ***
<WORD>
    <TEXT>she </TEXT>
    <STIME>151710</STIME>
    <ETIME>151900</ETIME>
</WORD>
<WORD>
    <TEXT>will </TEXT>
    <STIME>151900</STIME>
    <ETIME>152040</ETIME>
</WORD>
<WORD>
    <TEXT>RTC </TEXT>
    <STIME>152040</STIME>
    <ETIME>152600</ETIME>
</WORD>
<WORD>
    <TEXT>if </TEXT>
    <STIME>152600</STIME>
    <ETIME>152710</ETIME>
</WORD>
<WORD>
    <TEXT>not </TEXT>
    <STIME>152710</STIME>
    <ETIME>152870</ETIME>
</WORD>
<WORD>
    <TEXT>improved</TEXT>
    <STIME>152870</STIME>
    <ETIME>153350</ETIME>
</WORD>
<WORD>
    <TEXT>. </TEXT>
    <STIME>153350</STIME>
    <ETIME>153820</ETIME>
</WORD>
    </WORDS>
</ASRRESULTS>
```

It is noted that in the above example results file, time index information is associated with each word or group of words in the recognized speech text file. This time index data includes a start time and end time for this spoken word. In addition, there can be additional information within this results file, including header information that provides details such as speaker information, task IDs, user IDs, overall duration information for the recorded speech, and any other desired information. It is further noted that the time indexing could be provided on a per phrase basis, on a per sentence basis, on a per word basis, on a per syllable basis, or on any other time basis as desired. In addition, other time index formats, such as start position only, end position only, midpoint position only, or any other position information or combination thereof can be utilized as desired.

Looking back to FIG. 2, in block 208, the digital audio file and the indexed text result file are communicated to a transcription station. In block 210, a document template is loaded at the transcription station, if it is desired that a document template be utilized. If a document template is not loaded, then typically a blank document would be utilized by the transcriptionist. In block 212, the contents of the time-indexed text result file is sequentially inserted into the document such that a transcriptionist may edit and format the contents as they are inserted into the document. In block 214, the sequential insertion is periodically synchronized with the playback of the compressed audio file, if it used by the transcriptionist. Typically, it would be expected that the transcriptionist would utilize audio playback to facilitate the editing of the recognized speech; however, the sequential insertion of the speech recognition contents could be utilized even if audio playback were not desired or if audio files were unavailable. It is further noted that the sequential insertion of the speech recognition contents can be utilized without a time-indexed result file. In other words, the time indexing could be removed from a speech recognition result file, and the plain text could be sequentially inserted without departing from the present invention.

Sequential insertion of the contents of a speech recognition results file according to the present invention provides a significant advantage over the current practice of delivering an entire text-only result file into a document at one time. This prior entire-result delivery technique creates a difficult and undesirable transcription environment. In contrast, sequential insertion can be accomplished by presenting the contents of the result file piece-by-piece so that the transcriptionist has time to consider each content piece independently and can better provide focused attention to this content piece as it is inserted into the document. This sequential insertion is particularly advantageous where time-indexed text result files are used in conjunction with audio playback devices that can be polled for elapsed time information with respect to audio files that the devices are playing back to the transcriptionist. By periodically polling the audio playback device and using the time-index data within the speech recognition results, the transcription station can synchronize the insertion of the contents of the speech recognition result file with the audio playback. And as stated above, this synchronization can be implemented in a variety of ways, as desired, such that the audio corresponding to the inserted words can be played back before the words are inserted, at the same time the words are inserted, or after the words are inserted, depending upon the implementation desired. In addition, as stated above, the amount of "lag" or "lead" between the audio playback and the insertion of the corresponding text can be adjustable, if desired, and this adjustment can be provided as an option to the transcriptionist, such that the transcriptionist can select the amount of "lag" or "lead" that the transcriptionist desires. In this way, the transcriptionist is seeing the contents of the result file in-time, or at some "lag" or "lead" time, with what the transcriptionist is hearing. Still further, this synchronization technique can allow for standard audio playback techniques to also control the sequential insertion thereby providing smooth speed, stop/start and other control features to the transcriptionist. The transcriptionist can then simply determine whether the inserted content matches the spoken content and edit it appropriately. Where document templates are utilized, the sequential insertion of the contents of the speech recognition results has even further advantages. In particular, the sequential insertion technique allows the transcriptionist to position the cursor at the appropriate place in the template as the sequential insertion and audio playback are proceeding. Alternatively, as described in more detail herein, the entirety of the speech recognition results could be inserted into the proper locations in the template during a pre-process step rather than word by word as the transcriptionist listens.

FIG. 3 is a block diagram of an embodiment for a transcription station 110 including a processing system 304 operating a sequential insertion module 130. Initially, it is noted that the sequential insertion module can be implemented as software code that can be transferred to the transcription station 110 in any desired fashion, including by communication from the server systems 102 through communication interface 112C, as depicted in FIG. 1B. This software code could be stored locally by the transcription station, for example, on storage device 314. The transcription station 110 can be implemented as a computer system capable of displaying information to a transcriptionist and receiving input from a transcriptionist. Although it is useful for the transcription station 110 to have local storage, such as storage device 314, it is possible for the transcription station 110 to simply use volatile memory to conduct all operations. In such a case, data would be stored remotely. As depicted in FIG. 3, in operation, the processing system 304 runs the sequential insertion module in addition to other software or instructions used by the transcription station 110 in its operations.

In the embodiment of FIG. 3, one or more input devices 306 are connected to the processing system 304. The input devices 306 may be a keyboard 318A, a mouse 318B or other pointing device, and/or any other desired input device. The transcription station 110 can also include a communication interface 316 that is connected to or is part of the processing system 304. This communication interface 316 can provide network communications to other systems, if desired, for example communications to and from the remote transcription server systems 128, as depicted in FIG. 1B. The transcription station 110 can also include an audio listening device 322 and audio playback control device 308 coupled to the processing system 304. The audio listening device 322 may be, for example, PC speakers or headphones. Where the transcription station 110 is a computer system, the audio playback control device 308 can be, for example, a foot controlled device that connects to a serial data port on the computer system. In addition, the transcription station 110 can include storage device 314, such as a hard disk or a floppy disk drive. The storage device 314 is also connected to the processing system 304 and can store the information utilized by the transcription station 110 to accomplish the deferred transcription of speech information. As shown in the embodiment of FIG. 3, this stored information includes the indexed text result file 124, the compressed digital audio file 122, document templates 317 and resultant data files 126. Although not shown, speaker profiles could also be stored locally and used or updated by the transcriptionist. The display device 302 represents the device through which the transcriptionist views the sequentially inserted speech recognition results and views edits made to the text. As depicted, the display is showing a document 310 that includes sections 312A, 312B, 312C and 312D which represent various desired input fields or areas within a document template. The sections 312A, 312B, 312C and 312D can be configured to have particular text and style formatting automatically set for the particular sections, as desired. This pre-formatting can be provided to facilitate the efficiency of creating a resultant document having information presented in a desired format.

The following provides an example of how sequential insertion with aligned audio playback, if utilized, would look and sound to a transcriptionist during operation utilizing the example speech recognition results set forth above. It is noted again that the "***" designation represents skipped portions of the speech recognition results. For example, if a standard SOAP note were being dictated, the standard Objective, Assessment and Plan fields would also exist in the resultant data file, as well as other information about the patient and the patient's condition. And it is further noted, as stated above, that the audio playback could be in-time with the insertion of the corresponding text, or could be at some "lag" or "lead" time with respect to the insertion of the corresponding text, as desired.

TABLE 1

SEQUENTIAL INSERTION EXAMPLE

| Time Index Data (1/1000 seconds) | Audio Playback (if utilized) | Sequentially Inserted Speech Recognition Results | Screen Contents with Likely Edits by Transcriptionist |
|---|---|---|---|
| 1810-2180 | Karen | Karen | Karen |
| 2180-2670 | Jones | Jones | Karen Jones<br>\*\*\* |
| 12400-13140 | subjective | SUBJECTIVE | Karen Jones<br>\*\*\* |
| | \<silence\> | \<none\> | SUBJECTIVE:<br>Karen Jones<br>\*\*\* |
| 14160-14610 | Karen | Karen | SUBJECTIVE:<br>Karen Jones<br>\*\*\* |
| 14490-14610 | is | is | SUBJECTIVE: Karen<br>Karen Jones<br>\*\*\* |
| 14610-14670 | an | an | SUBJECTIVE: Karen is<br>Karen Jones<br>\*\*\* |
| 14670-15140 | eighteen | 18 | SUBJECTIVE: Karen is an<br>Karen Jones<br>\*\*\* |
| 15140-15470 | year old | -year-old | SUBJECTIVE: Karen is an 18<br>Karen Jones<br>\*\*\* |
| 15470-15920 | female | female | SUBJECTIVE: Karen is an 18-year-old<br>Karen Jones |
| 15920-15980 | who | who | SUBJECTIVE: Karen is an 18-year-old female<br>Karen Jones<br>\*\*\* |
| 15980-16230 | came | came | SUBJECTIVE: Karen is an 18-year-old female who<br>Karen Jones<br>\*\*\* |
| 16230-16410 | in | in | SUBJECTIVE: Karen is an 18-year-old female who came<br>Karen Jones<br>\*\*\* |
| 16410-16670 | for | for | SUBJECTIVE: Karen is an 18-year-old female who came in<br>Karen Jones<br>\*\*\* |
| 16670-17130 | a possible | a possible | SUBJECTIVE: Karen is an 18-year-old female who came in for<br>Karen Jones<br>\*\*\* |
| 17130-17660 | pneumonia | pneumonia | SUBJECTIVE: Karen is an 18-year-old female who came in for possible<br>Karen Jones<br>\*\*\* |
| | \<silence\> | N/A | SUBJECTIVE: Karen is an 18-year-old female who came in for possible pneumonia<br>Karen Jones<br>\*\*\* |
| 18520-18990 | period | . | SUBJECTIVE: Karen is an 18-year-old female who came in for possible pneumonia<br>Karen Jones<br>\*\*\* |
| 151710-151900 | she | She | SUBJECTIVE: Karen is an 18-year-old female who came in for possible pneumonia.<br>Karen Jones<br>\*\*\* |
| 151900-152040 | will | will | SUBJECTIVE: Karen is an 18-year-old female who came in for possible pneumonia.<br>Karen Jones<br>\*\*\*<br>She |
| | | | SUBJECTIVE: Karen is an 18-year-old female who came in for possible pneumonia.<br>Karen Jones<br>\*\*\*<br>She will |

TABLE 1-continued

SEQUENTIAL INSERTION EXAMPLE

| Time Index Data (1/1000 seconds) | Audio Playback (if utilized) | Sequentially Inserted Speech Recognition Results | Screen Contents with Likely Edits by Transcriptionist |
|---|---|---|---|
| 152040-152600 | RTC | RTC | Karen Jones<br>*<br>SUBJECTIVE: Karen is an 18-year-old female who came in for possible pneumonia.<br>* |
| 152600-152710 | if | if | She will RTC<br>Karen Jones<br>*<br>SUBJECTIVE: Karen is an 18-year-old female who came in for possible pneumonia.<br>* |
| 152710-152870 | not | not | She will RTC if<br>Karen Jones<br>*<br>SUBJECTIVE: Karen is an 18-year-old female who came in for possible pneumonia.<br>* |
| 152870-153350 | improved | improved | She will RTC if not<br>Karen Jones<br>*<br>SUBJECTIVE: Karen is an 18-year-old female who came in for possible pneumonia.<br>* |
| 153350-153820 | period | . | She will RTC if not improved<br>Karen Jones<br>*<br>SUBJECTIVE: Karen is an 18-year-old female who came in for possible pneumonia.<br>*<br>She will RTC if not improved. |

As shown in the example set forth in TABLE 1 above, the audio playback and the sequential insertion are aligned. When audio playback is also utilized by the transcriptionist, the audio playback and sequential insertion can be aligned using the time index information to further facilitate the accurate and efficient transcription and correction of the speech recognition results. Thus, when the transcriptionist hears the word being spoken in the audio playback process the transcriptionist also sees the speech recognition results for the related time index. As discussed above, this sequential insertion of speech recognition results for deferred transcription provides significant advantages over prior techniques. This sequential insertion, as well as aligned audio playback, is even more advantageous when the resultant data file is desired to be formatted according to a particular document template. Such document templates in the medical transcription field include, for example, templates such as SOAP notes or other standard medical reporting formats.

FIG. 4 is a block diagram of an embodiment for a medical transcription environment 400 in which the sequential insertion module of the present invention can be utilized. As depicted, this medical transcription environment 400 is a web-based architecture that utilizes the Internet 402 for communicating information among the various components of the architecture. For example, one or more web-based customer sites 404, one or more client/server customer sites 408 and one or more telephone-based customer sites 424 can be connected to the Internet to communicate analog audio files, digital audio files and/or speech recognition results to the network operations center 430. One or more transcription sites 406 can also be connected to the Internet 402 to receive speech information from the network operations center 430 and provide back transcribed dictation result files utilizing sequential insertion modules 415 that run on one or more web clients 416.

The web-based customer sites 404 represent customer sites that are directly connected to the Internet through web clients 412. The web-based customer sites 404 can also include digital input devices 410 and local file systems 414. It is expected that these customers will communicate linear or compressed digital audio files, such as files in a standard WAV format, to the network operations center 430. It is noted that other configurations and communication techniques could be utilized, as desired.

The client/server customer sites 408 represent customers that have a one or more server systems 418 and one or more local client systems 422. These systems, for example, can allow for local speech recognition and related instantaneous correction to be conducted locally and stored centrally at the customer site. Thus, although it is likely that these client/server customers may have no need for deferred transcription and correction services and would only be retrieving resultant data files, it may be the case that these client/server customers will communicate speech recognition result files to the network operations center 430 for further processing. In addition, the client/server customer sites 408 can be configured to communicate information to one or more hospital information systems 420, or in the case where a client/server customer site 408 is hospital, then the hospital information system 420 would likely be local. It is noted that other configurations and communication techniques could be utilized, as desired.

The telephone-based customer sites 424 represent customers that desire to use telephones 426 to provide audio speech information to the network operations center 430. It is expected that telephones 426 would be connected to the network operations center 430 through a communication network 428 that would include a telephone network and one or more T1 type communication lines. For example, three (3) T1 lines could be used by the network operations center 430 to communicate through the telephone network to client telephones.

It is noted that the customer sites 404, 408 and 424 represent three basic types of customer sites. These customer sites can be located together or apart in one or more physical locations and can be configured in any variety of combinations. Further examples of customer site types and combinations are set forth below. It is noted that in these examples "input" refers to providing dictation information to the network operations center 430, and "retrieval" refers to obtaining transcribed and edited resultant data files from the network operations center 430.

1. Input-only site that uses digital input devices. This site would correspond to web-based customer site 404 without the local file systems 414.
2. Input-only site using the telephone. This site would correspond to a telephone-based customer site 424.
3. Input-only site using both digital input devices and the telephone. This site would be a combination of 1 and 2 above.
4. Retrieval-only site using a web client. This would correspond to a web-based customer site 404 without the digital input device box 410.
5. Retrieval-only site using MD Dictate PC, available from Expresiv Technologies. This would correspond to the client/server customer site 408 depicted in FIG. 4 where retrieval-only was desired.
6. Input and retrieval site using digital input devices and local file system. This would correspond to the web-based customer site 404 depicted in FIG. 4.
7. Input and retrieval site using telephone input devices and local file system. This would be combination of 2 and 4 above.
8. Input and retrieval site using digital input devices and MD Dictate PC. This would be a combination of 1 and 5.
9. Input and retrieval site using both digital input devices and the telephone and the local file system. This would be a combination of 2 and 6.
10. Input and retrieval site using both digital input devices and the telephone and MD Dictate PC. This would be a combination of 1, 2 and 5.

Typically, input-only and retrieval-only sites will be used in combination by a given entity. For example, input may be done at outlying facilities with retrieval of resultant data files occurring at a central facility. It is noted that alternative and modified combinations and architectures to those set forth above could be utilized as desired for generating speech information, for providing speech information for deferred transcription processing and for obtaining the transcribed and corrected results back after processing.

The network operations center 430 represents one or more systems that facilitate the deferred transcription of dictated information. The network operations center 430, for example, can process analog audio files, digital audio files and speech recognition results to provide speech information to the transcription sites 406. As depicted, the network operations center 430 includes two (2) firewall devices 446 that provide a security layer between the Internet 402 and the two (2) hubs 442. The hubs 442 also connect to two (2) telephony servers 438 that provide for connection to the telephone network, which can include T1 lines, represented by network 428.

Hubs 442 are also connected to two database and file servers 440 and two (2) load balancers 444. The load balancers 444 are in turn connected to two or more application servers 448. The database and file servers 440 can be configured to store the data that may be used for the deferred dictation services, such as uncompressed audio files, compressed audio files, speaker profiles, indexed-text speech recognition result files and resultant data files. The application servers 448 can be configured to provide processing tasks, such as speech recognition processing of audio files. Although not shown, the main network operations center 430 can also include one or more domain controllers that manage user permissions for direct (e.g., not browser-based) access to the various machines in the server racks.

The telephony servers 438 can be general servers configured to handle a large number of incoming telephone calls, to serve up prompts on the telephone and to perform analog-to-digital conversion as part of the recording process. The primary storage of uncompressed digital audio files received over the telephones can also be attached directly to the telephony servers 438 through a storage device that may be shared between two or more telephone server processing units. The database/file servers 440 are configured to form a redundant system and preferably include at least two processing units, with one of them serving file operations and with the other serving database operations. In addition, each of these processing units are preferably configured to be capable of taking over the other processing unit's function in case of a failure. In addition, the two or more processing units can share common storage, such as a single, large SCSI-RAID disk array storage unit. The contents of this storage unit can also be backed up periodically by a backup server and backup media. The application servers 448 can be a plurality of redundant blade servers, each of which is configured to perform any of a variety of desired functions, such as serving up web pages, compressing digital audio files, running speech recognition engines, and counting characters in each transcript for billing and payroll purposes. The load balancers 444 can be configured to direct traffic between the application servers 448 to help increase the responsiveness and throughput provided for high-priority tasks. It is noted that these system components are for example and that other and/or additional hardware architectures, system configurations, implementations, connections and communication techniques could be utilized, as desired.

In operation, as discussed above, speech information is sent from the customer sites 404, 408 and/or 424 to the network operations center 430 in the form of analog audio files, digital audio files, speech recognition results or other desired form. The network operations center 430 processes this speech information and provides speech recognition results and/or digital audio files to the web clients 416 at one or more transcription sites 406. The speech recognition results, as described above, can be XML-formatted time-indexed text files or other types of files that include text correlating to recognized speech recognized words. At the transcription sites 406, sequential insertion modules 415 running on local systems can be utilized to generate resultant data files, as discussed above. These resultant data files can then sent to the network operations center 430 for further processing. If desired, the resultant data files can be passed through quality assurance (QA) procedures, for example, by sending the resultant data file and the digital audio file to a QA specialist who checks the quality of the resultant data files and/or provides further editing of those files. Once the resultant data files have been finalized, they can be provided back to the customer sites 404, 408 and 424 or to some other destination server system, such as a hospital information system. It is noted that the resultant data files from the transcription sites 406, if desired, can be sent directly back to the customer sites 404, 408 and 424 or to some other destination server system rather than first going back to the network operations center 430. It is further noted that in the medical transcription context, the resultant data files will likely be created using a standard document template, such as the SOAP note format identified above.

FIG. 5 provides a block diagram for an additional embodiment 500 for utilizing sequential insertion of speech recognition results. The basic element can be represented by block 520 which provides for deferred correction of speech information utilizing sequential insertion of speech recognition results. Block 502 represents one example speech input in the form an analog audio input. This analog audio information can be converted to a digital audio file using an analog-to-digital conversion engine 504. Uncompressed digital audio files 506 can then be provided to blocks 508, 510 and 520. The audio compression engine 510 represents the use of compression to generate compressed audio files 516, if these are desired. Block 508 represents the speech recognition process that uses a speech recognition engine to analyze speech information and to create initial results 514 that represent the results of the speech recognition process. The speech recognition engine 508 can use speaker profiles 512 to facilitate the recognition of speech information. It is noted that rather than receive uncompressed digital audio files 506, the speech recognition engine 508 could also directly receive the output of the analog-to-digital conversion engine 504, could receive the output of a second analog-to-digital conversion engine that works in parallel with the analog-to-digital conversion engine 504 (e.g., where a computer system had one microphone connected to two sound cards with analog-to-digital conversion engines), or could receive the output of a second analog-to-digital conversion engine that received an analog input from an analog input device that works in parallel with the audio input 502 (e.g., where a computer system has two microphones connected to two separate sound cards with analog-to-digital conversion engines). It is further noted that other techniques and architectures could be used, as desired, to provide speech information to a speech recognition engine that then generates speech recognition results for that speech information.

Looking back to FIG. 5, the sequential insertion operation 520 uses the initial results 514 to facilitate the correction of the speech information. In so doing, the sequential insertion operation 520 can also use and update speaker profiles 512, compressed audio files 516 and document templates 522, if desired. During operations, the sequential insertion correction process 520 can generate intermediate result files 518 that are stored until the work is complete at which time final result files 524 are finalized. Block 526 represents the final destination for the final result files 524 generated by the deferred transcription and correction operations. It is noted that each of blocks 506, 512, 514, 516, 528, 522 and 524 represent data files that can be stored, as desired, using one or more storage devices, and these data files can be stored in multiple locations, for example, where initial speech recognition results files 514 are stored by a first system on a local storage device and then communicated through the Internet to a second system that then stores the speech recognition results files 514 on a second storage device. It is further noted, therefore, that the systems, storage devices and processing operations can be modified and implemented, as desired, without departing from the sequential insertion of speech recognition results according to the present invention.

FIG. 6 is a block diagram of another embodiment 600 for utilizing the sequential insertion of speech recognition results where the speech recognition results file is in a different format from a time-indexed text file. In this embodiment, the speech recognition result files are hybrid text/audio result files 614. Block 602 represents one example speech information input in the form of an analog audio input that can be converted to a digital audio file in block 604 using an analog-to-digital conversion engine. The speech recognition engine 608 processes this speech information and can use speaker profiles 612, if desired. As depicted, the speech recognition results in FIG. 6 are hybrid result files 614 that include text and the corresponding audio information within the same file. The sequential insertion operation 620 utilizes these hybrid result files 614 to create final result files 624. The sequential insertion operation 620 can also utilize and update speaker profiles 612, can utilize document templates 622 and can generate intermediate result files 618 as work is in progress. Block 626 represents the ultimate destination for the final result files 624. As described above, the systems, storage devices and processing operations can be modified and implemented, as desired, without departing from the sequential insertion of speech recognition results according to the present invention.

FIG. 7A is a block diagram of an embodiment for sequential insertion of speech recognition results in a transcription environment including a variety of systems connected through communication networks. FIG. 7A is similar to FIG. 1B, discussed above, in that speech recognition results are sequentially inserted into a document or document template so that the results can be processed, positioned and/or formatted as the results are sequentially inserted into the electronic document. In FIG. 7A, however, a server-side sequential insertion subsystem 700 is included as part of speech recognition and result server systems 102. This sequential insertion subsystem 700 helps facilitate automated sequential processing of speech recognition results, in particular, on the server side of the environment as depicted in FIG. 7A.

In the deferred transcription environment 100 depicted in FIG. 7A, the automated sequential insertion subsystem 700 can be utilized to provide automated sequential insertion processing of speech recognition results, as discussed in more detail below. In part, the automated sequential insertion subsystem 700 can be used to perform sequential insertion processing and to auto-fill a document or document template with text from the speech recognition results. In this automated server-side processing, the speech results file is again analyzed as its contents are sequentially inserted into the resultant data file and automated processing rules can be applied. The auto-fill process, for example, can recognize triggers within the speech recognition results so that resultant data files can be automatically generated in a desired format with text positioned at desired locations within the document or document template. Because the resultant data files are auto-filled by this automated sequential insertion process on the server side, sequential insertion operations at the transcription stations 110A, 110B, 110C, etc. can be eliminated, if desired. Thus, in FIG. 7A, the sequential insertion module 130A is not depicted. Instead, the transcription stations 110A, 110B, 110C, etc. can be utilized to verify and proof the results of the processing done by the automated sequential insertion subsystem 700. And in performing these verification and proofing operations, audio playback information could be utilized by the users of the transcription stations 110A, 110B, 110C, etc., as they review and proof the text in the data files generated by the subsystem 700. In addition, it is noted that sequential insertion processing could still be performed on the client side at the transcription stations themselves, if desired, and this client side sequential insertion could also be automated, as desired.

FIG. 7B is a block diagram of an example embodiment for an automated sequential insertion subsystem 700. The template sequential insertion processor 706 receives speech recognition result files, as represented by arrow 708, and generates auto-filled resultant data files, as represented by arrow 710. For a particular transcription, the template sequential insertion processor 706 sequentially analyzes the contents of the speech recognition result file and inserts the information into a document template in order to generate an auto-filled resultant data file. As part of the sequential insertion analysis and auto-fill process, the template sequential insertion processor 706 can utilize a formed document template, for example, from a formed templates database 702. The formed template database can include a plurality of different document templates, as represented by formed templates 704A, 704B, 704C, . . . in FIG. 7B. As discussed further below, each formed template 704A, 704B, 704C, . . . can include an embedded dictionary 714A and related processing rules 712A. The template sequential insertion processor 706 sequentially analyzes the speech recognition results to determine if text strings, such as words, terms, phrases or punctuation, recognized within the results match entries or triggers within the embedded dictionary. When any such text strings are identified, the embedded dictionary 714A and related processing rules 712A provide instructions as to how the speech recognition results are to be treated in sequentially inserting those results into a document or document template. Actions set forth by the processing rules are then taken with respect to portions of the file being sequentially inserted into the document template.

As described in more detail with respect the tables below, the templates within the database 702 can be formed such that different document sections, headings, etc. can be identified as tags for insertion points within the embedded dictionary 714A. As such, when the template sequential insertion processor 706 identifies speech recognition results that match information within the dictionary 714A and that dictionary information is linked to a section or heading in the formed template, the processor 706 can insert the text in the appropriate portion of the document template. As represented by processing rules block 712A, the template sequential insertion processor 706 can also utilize context and position sensitive algorithms in determining the appropriate action to take when analyzing a recognized word or phrase within the speech recognition results. It is noted that a variety of algorithms and criterion could be utilized for the processing rules, as desired, when analyzing the speech recognition results and sequentially inserting them into the document or document template.

FIG. 7C is a process block diagram of an example procedure 750 for generating auto-filled resultant data files. In block 752, a speech recognition file is obtained, for example, from a database of stored speech recognition files. In block 754, a formed document template is obtained, for example, for a database of stored document templates. In block 756, automated sequential insertion processing is utilized to auto-fill the template using the speech recognition results within the speech recognition file. In block 758, an auto-filled resultant data file is output. Finally, if desired, the resultant date file can be proofed and verified in block 760. As indicated above, if desired, the automated sequential insertion processing can be accomplished by one or more server systems, and the proofing and verification operations can be accomplished at individual transcription stations. In addition, if desired, the one or more server systems can be configured to reflow ASR results into different templates upon request or upon some automated determination that an improper template has been utilized. As one example, a transcriptionist can be provided the ability to request that (ASR) results be re-processed using a different template. For example, a dictator may have indicated that SOAP note was being dictated when the dictator should have indicated that a Discharge Summary was being dictated. The transcriptionist could detect this error and then request that the ASR results be processed again with the correct template. This request could be provided in any manner desired, including through network communications as discussed above. When a re-processing or reflow request occurs, the server can then change to a different or correct template and reflow the ASR results into the new template utilizing sequential insertion processing. The new resultant data files can then be provided for proofing and verification.

FIG. 8A is a block diagram of an example system 800 for generating formed documents document templates. Initially, an unformed document or document template 802 is received by the formed template generation engine 804. The formed template generation engine 804 analyzes the document template 802 to determine sections, headings, etc., within the document that can provide tags for insertion points to indicate where content should be placed within the document. As discussed above, document templates used by many companies expect particular information to be including within particular portions of the document. For example, SOAP notes utilized in the medical profession expect patient and condition information to be placed in particular locations within the formatted document. Thus, with respect to the SOAP note, for example, each heading (SUBJECTIVE, OBJECTIVE, ASSESSMENT, PLAN) provides a good insertion point tag within the document to indicate where information should be placed. And one or more triggers can be associated with each tag, where the triggers represent variations in speech recognition results that will be deemed to correspond to the insertion point tag. When speech recognition results are then sequentially processed and inserted into the resultant data file, certain trigger words such as "subjective," "objective," "assessment," and "plan" within the speech recognition results can be recognized and used to indicate that associated text should be placed at the corresponding insertion points within the document template.

The formed template generation engine 804 utilizes one or more master data dictionaries 806A, 806B, 806C . . . to generate a formed template 704A from the initial unformed document template 802. In the embodiment depicted, the formed template 704A includes an embedded data dictionary 714A and related processing rules 712A. The master dictionaries 806A, 806B, 806C . . . can be configured for particular fields, companies or industries. For example, master dictionary 806A can be designed and configured for use with the medical industry. Each of the master dictionaries 806A, 806B, 806C . . . can include sub-blocks that help facilitate the processing of the unformed document template 802. As depicted, the master dictionary 806A includes a pattern recognition block 810A, a triggers block 812A, a relationships block 814A, and a navigation points block 816A. The pattern recognition block 810A provides information concerning what punctuation, capitalization, formatting, font size, font type, location, etc. within the document will identify a portion of the document that should be treated as a separate section or an insertion point tag for information to be input into the document. The triggers block 812A provides information concerning what words, terms and phrases should be used as triggers for insertion points within the document, where triggers represent variations in speech recognition results that will be deemed to correspond to insertion points. The relationships block 814A provides information allowing for attribute sensitive processing, such as by looking to the context and positioning of the words, terms or phrases within the speech results. And the navigation points block 816A provides tag positioning information concerning location and position of sections and insertion points identified within the document. When processed, the unformed document template 802 becomes a formed document template 704A that includes an embedded data dictionary 714A and related processing rules 712A. The embedded data dictionary 714A and related processing rules 712A can represent subsets of the master dictionary 806A that are pertinent to that particular formed document template 704A.

It is noted that prior documents and sample documents representing the resultant documents desired by a customer as a end product can be used as training aids in creating the dictionaries. For example, a hospital may have a number different standard forms that include information that is typically dictated by a doctor. Prior samples of such documents or prior samples of dictation can be analyzed to identify entries for a dictionary and to identify common variations used to represent a term, section or heading within the resulting document. Consider the section head "OBJECTIVE." Doctors dictating into a form including this heading may use the whole word "objective" or may use variations, such as "OB," "OBJ," "object," etc. By analyzing historical templates, dictations and resulting transcribed documents, tag and/or trigger dictionaries can be generated that will facilitate processing of templates to generate formed document templates that can in turn facilitate navigation through a document or document template during the sequential insertion processing.

FIG. 8B is a process block diagram of example procedures 850 for processing a document template to create a formed document template. Initially, in block 852, a document template is obtained. In block 854, the template is processed using the master dictionary. Next, the embedded dictionary and related processing rules are generated in block 856. Finally, in block 358, a formed document template is output. This formed document template includes the embedded dictionary and related processing rules.

Formed documents or templates and related data dictionaries can take many forms according the present invention. In basic terms, a formed document or template is one that includes one or more items that can be used to indicate where content should be placed within the document or template. These items, which can then be identified as tags and corresponding triggers for insertion points, serve as a roadmap for the automated sequential insertion. These document tags and corresponding triggers are included within the embedded dictionary.

Set forth below is an example target section entry for a section defined in an example data dictionary, such as a master dictionary 806A or an embedded data dictionary 714A, which as described above can be a subset of the master dictionary information that is related to a particular formed document template. The example below is an XML formatted listing that contains several aliases (TARGETTEXT) for the section (SKIN). The aliases provide different text strings that may be utilized in the template to represent the section "SKIN." By associating the aliases with the entry, a plurality of text strings within the template can be recognized during template processing and be utilized to identify an insertion point tag for that document template. As shown below, related section information can also be included, such as possible super-sections for this "SKIN" section (i.e., this section could be a subsection of the OBJECTIVE, REVIEW_OF_SYSTEMS, or PHYSICAL_EXAM sections in a document template). In addition, a rule can be included to indicate whether the entry and aliases are only valid within a particular section. In the example below, this is designated by the "MEMBER OF REQUIRED" setting. It is noted that the master dictionary can include any number of target section entries for sections or insertion points that are expected to possibly appear within a document template to be processed. It is further noted that once a template is processed, the embedded data dictionary for that formed document template may include a tag entry and associated triggers for each insertion point within the document template.

```
<TARGETSECTION NAME="SKIN" TYPE="BODY">
    <ALIASES>
        <TARGETTEXT NAME="skin and wound
            examination" />
        <TARGETTEXT NAME="skin/wounds exam" />
        <TARGETTEXT NAME="dermatology" />
        <TARGETTEXT NAME="skin" />
        <TARGETTEXT NAME="dermatology
            examination" />
        <TARGETTEXT NAME="skin/wound exam" />
        <TARGETTEXT NAME="skin and wounds" />
        <TARGETTEXT NAME="skin/wound examination" />
        <TARGETTEXT NAME="dermatology exam" />
        <TARGETTEXT NAME="skin exam" />
        <TARGETTEXT NAME="skin and wound exam" />
        <TARGETTEXT NAME="skin and wounds
            examination" />
        <TARGETTEXT NAME="dermatologic exam" />
        <TARGETTEXT NAME="skin condition" />
        <TARGETTEXT NAME="derm exam" />
        <TARGETTEXT NAME="dermatologic
            examination" />
        <TARGETTEXT NAME="dermatological" />
        <TARGETTEXT NAME="skin/wounds
            examination" />
        <TARGETTEXT NAME="skin/wounds" />
        <TARGETTEXT NAME="derm" />
        <TARGETTEXT NAME="dermatologic" />
        <TARGETTEXT NAME="dermatological exam" />
        <TARGETTEXT NAME="skin/wound" />
        <TARGETTEXT NAME="dermatological
            examination" />
        <TARGETTEXT NAME="skin and wounds exam" />
        <TARGETTEXT NAME="skin and wound" />
        <TARGETTEXT NAME="skin examination" />
        <TARGETTEXT NAME="derm examination" />
    </ALIASES>
    <MEMBEROF REQUIRED="FALSE">
        <SUPERSECTION NAME="OBJECTIVE" />
        <SUPERSECTION NAME="REVIEW_OF_SYSTEMS" />
        <SUPERSECTION NAME="PHYSICAL_EXAMI-
            NATION" />
    </MEMBEROF>
</TARGETSECTION>
```

Set forth below is an example of trigger entries for a specified tag, defined in an example data dictionary, such as a master dictionary 806A or an embedded data dictionary 714A, which again as described above can be a subset of the master dictionary information that is related to a particular formed document template. The example below is an XML formatted listing that contains several triggers for the section (SKIN). These trigger entries provide different text strings that may be utilized by the person dictating to indicate the corresponding text should be placed in the "SKIN" section. In addition, a rule can be included to indicate whether the trigger is valid only in certain locations in the template. In the example below, this is designated by the CONTEXTREQUIRED setting. In addition, in the embodiment below, the triggers are configured to have different components. For a particular trigger to match, the text within the TRIGGERPRETEXT, TRIGGERTEXT, and TRIGGERPOSTTEXT must all occur within the speech recognition results. If a match occurs, a navigation action occurs to the insertion point associated with the tag specified by the TRIGGER AUTONAVNAME setting, which is SKIN in this example.

The TRIGGERTEXT setting specifies the primary text string associated with the trigger. The TRIGGERPRETEXT setting identifies any text that must occur before the TRIGGERTEXT to cause a match. And the TRIGGERPOSTTEXT setting identifies any text that must occur after the TRIGGERTEXT to cause a match. The TRIGGERPRETEXT, TRIGGERTEXT AND TRIGGERPOSTTEXT values also determine where and if the trigger text itself will be inserted in the resultant data file, with TRIGGERPRETEXT inserted prior to the navigation event, TRIGGERTEXT not inserted at all and TRIGGERPOSTTEXT inserted after the navigation event. It is noted that different trigger schemes could be implemented, as desired, while still identifying information within the speech recognition results that will cause a match to occur and thereby invoke an action associated with the associated tag.

```
<TRIGGER AUTONAVNAME="SKIN" TRIGGERPRETEXT="" TRIGGERTEXT="upon skin
    wounds examination" TRIGGERPOSTTEXT="" CONTEXTREQUIRED="Y"
    PRIORITY="1" />

<TRIGGER AUTONAVNAME="SKIN" TRIGGERPRETEXT="" TRIGGERTEXT="patient's skin
    exam" TRIGGERPOSTTEXT="" CONTEXTREQUIRED="Y" PRIORITY="1" />

<TRIGGER AUTONAVNAME="SKIN" TRIGGERPRETEXT="" TRIGGERTEXT="dermatologic
    examination:" TRIGGERPOSTTEXT="" CONTEXTREQUIRED="Y" PRIORITY="1" />

<TRIGGER AUTONAVNAME="SKIN" TRIGGERPRETEXT="" TRIGGERTEXT="patient's skin
    slash wounds examination" TRIGGERPOSTTEXT="" CONTEXTREQUIRED="Y"
    PRIORITY="1" />

<TRIGGER AUTONAVNAME="SKIN" TRIGGERPRETEXT="" TRIGGERTEXT="dermatology
    exam:" TRIGGERPOSTTEXT="" CONTEXTREQUIRED="Y" PRIORITY="1" />

<TRIGGER AUTONAVNAME="SKIN" TRIGGERPRETEXT="" TRIGGERTEXT="her
    dermatological examination" TRIGGERPOSTTEXT="" CONTEXTREQUIRED="Y"
    PRIORITY="1" />

<TRIGGER AUTONAVNAME="SKIN" TRIGGERPRETEXT="" TRIGGERTEXT="skin / wound
    examination:" TRIGGERPOSTTEXT="" CONTEXTREQUIRED="Y" PRIORITY="1" />
<TRIGGER AUTONAVNAME="SKIN" TRIGGERPRETEXT="" TRIGGERTEXT="patient's
    dermatological exam" TRIGGERPOSTTEXT="" CONTEXTREQUIRED="Y"
    PRIORITY="1" />
<TRIGGER AUTONAVNAME="SKIN" TRIGGERPRETEXT="" TRIGGERTEXT="upon derm
    exam" TRIGGERPOSTTEXT="" CONTEXTREQUIRED="Y" PRIORITY="1" />
<TRIGGER AUTONAVNAME="SKIN" TRIGGERPRETEXT="" TRIGGERTEXT="skin exam"
    TRIGGERPOSTTEXT="" CONTEXTREQUIRED="Y" PRIORITY="1" />
<TRIGGER AUTONAVNAME="SKIN" TRIGGERPRETEXT="" TRIGGERTEXT="on
    dermatological exam" TRIGGERPOSTTEXT="" CONTEXTREQUIRED="Y"
    PRIORITY="1" />
<TRIGGER AUTONAVNAME="SKIN" TRIGGERPRETEXT="" TRIGGERTEXT="upon derm
    examination" TRIGGERPOSTTEXT="" CONTEXTREQUIRED="Y" PRIORITY="1" />
<TRIGGER AUTONAVNAME="SKIN" TRIGGERPRETEXT="" TRIGGERTEXT="on derm
    exam" TRIGGERPOSTTEXT="" CONTEXTREQUIRED="Y" PRIORITY="1" />
<TRIGGER AUTONAVNAME="SKIN" TRIGGERPRETEXT="" TRIGGERTEXT="on skin exam"
    TRIGGERPOSTTEXT="" CONTEXTREQUIRED="Y" PRIORITY="1" />
```

Set forth below is an example of a tag matching routine that can be defined in an example data dictionary, such as a master dictionary 806A. Such pattern matching routines are utilized to identify insertion points within document templates. These tag matching routines typically include several regular expressions that can be used to match patterns of text in the template. For example, the particular regular expression set forth below would match anything that begins a line, includes capital letters and/or certain symbols, and ends with a ":". Once a pattern is matched, it is identified as an insertion point. The master dictionary is then checked to see if it has an entry and/or alias for a known section. If there is an entry or associated alias for the insertion point, then this entry/alias information is included as a tag entry within the embedded data dictionary for the document template along with corresponding triggers. If no entry or alias exists in the master dictionary, a tag entry can be automatically generated for the text string identified as an insertion point. This new entry and predicted triggers, if desired, can be included within the embedded data dictionary for the document template.

```
<TAGMATCHING>
    <REGEX VALUE="^\s*([A-Z\'\-\/\#\, ]+)(\:)"
        DESCRIPTION="allcaps at left margin" />
</TAGMATCHING>
```

TABLE 2 below provides an example template that could be utilized, and TABLE 3 provides an example embedded dictionary and related processing rules that could be associated with the template of TABLE 2.

TABLE 2

Example Document Template

Central Medical Associates
Austin, TX
Phone: 123-4567
OFFICE NOTE

TABLE 2-continued

Example Document Template

Patient Name:
MRN:
SUBJ:
OBJ: BP: Temp:
OPINION AND EVAL:
1.

Wanda M. Test, M.D.
WMT/abc
cc:

This example document template in TABLE 2 is intended for use in a medical field and represents one possible standard format that could be used by a medical institution to record information about patients. As is the practice of many doctors, information for this patient will be dictated for later transcription. As such, the doctor will dictate speech information that is intended to be located at particular positions within the resulting transcribed document. The document template of TABLE 2 has a number of sections with respect to which the doctor would be dictating information and expect text to be positioned in the resulting transcribed document. These sections include the sections MRN, SUBJ, OBJ, BP, Temp, OPINION AND EVAL that are all followed by a colon punctuation mark. In addition, it is noted that these sections can be super-sections or subsections for other sections. For example, OBJ is a super-section for BP and Temp. And BP and Temp are subsections of OBJ.

Once a document template, such as the one depicted in TABLE 2, has been processed, as described above, to identify insertion points, an embedded dictionary is included with the document. This embedded dictionary includes section information, trigger information, and any other desired processing rules associated with those sections and triggers, such as context information. TABLE 3 below provides an example for such an embedded dictionary.

TABLE 3

Example Embedded Dictionary Contents for Formed Document Template

| Section Name Aliases | Standardized Section Tag | Super- and Sub- section Relationships | Trigger patterns | | | Valid Contexts |
| --- | --- | --- | --- | --- | --- | --- |
| | | | Print Before Nav | Do Not Print | Print After Nav | |
| SUBJ | SUBJECTIVE | | | subjective | | any |
| | | | | NewLine subjective | | any |
| | | | | subjective colon | | any |
| OBJ | OBJECTIVE | | | objective | | any |
| | | | | NewLine objective | | any |
| | | | | objective colon | | any |
| | | | | objected | | SUBJECTIVE |
| BP | BLOOD PRESSURE | subsection of OBJECTIVE | | blood pressure | | OBJECTIVE |
| | | | | NewLine blood pressure | | OBJECTIVE |
| | | | | blood pressure colon | | OBJECTIVE |
| | | | | BP | | OBJECTIVE |
| Temp | TEMPERATURE | subsection of OBJECTIVE | | temp | | OBJECTIVE |
| | | | | temperature | | OBJECTIVE |
| | | | period | temperature is | | OBJECTIVE |
| | | | | | patient is afebrile | OBJECTIVE |

As set forth in the example dictionary of TABLE 3, information can be provided concerning sections within the template, relationships among sections, and rules associated with the sections. For example, the first column provides information about section names that have been identified as tags for the document template As seen in the above example, these section names correlate to those in the example template of TABLE2. The second column provides information concerning the standard heading that is utilized for a given section. These headings, for example, could match TARGETSECTION NAME settings in a master dictionary. The third column provides information concerning the relationship of sections. For example, a particular section may be a subsection of another section or it may be a super-section for one or more different subsections. This column, therefore, allows for hierarchical relationships to be defined within the template.

The next part of TABLE 3 provides example trigger processing rules associated with the dictionary. For example, trigger patterns can be provided that define what information within the speech recognition results will cause a trigger match and cause an action associated with the associated section or insertion point tag. As discussed above with respect to TRIGGERPRETEXT, TRIGGERTEXT, and TRIGGERPOSTTEXT, triggers can be configured to include different components, if desired. In TABLE 3, the text included in the "Print Before Nav" column correlates to the TRIGGERPRETEXT setting; the text included in the "Do Not Print" column correlates to the TRIGGERTEXT setting; and the text included in the "Print After Nav" column correlates to the TRIGGERPOSTTEXT setting. For example, the words listed under the "Do Not Print" heading represent those words that, if recognized in the speech recognition results, will cause a section or tag navigation to be triggered. And the recognized speech is not printed. The "Print Before Nav" and "Print After Nav" columns can be utilized to represent those words that, if recognized in the speech recognition results, will cause a section or tag navigation to be triggered and that will cause text to be inserted before or after the section navigation event has been triggered. As set forth in TABLE 3, for example, if the phrase "patient is afebrile" is included in speech recognition results, then a trigger match occurs, navigation moves to the "Temp" insertion point, and the phrase "patient is afebrile" is inserted as post text. As an example of pretext, if the phrase "period temperature is" is included in the speech recognition results, then a trigger match occurs, a "." is inserted, navigation moves to the "Temp" insertion point, and the phrase "temperature is" is not inserted.

The last column in TABLE 3 provides information for making navigation triggers context sensitive, such that recognized speech results that fall within the Trigger pattern column will only trigger a navigation event if the speech occurs within the proper section or context. For example, in TABLE 3, the navigation triggers for the TEMPERATURE section will only be valid if they are encountered within the speech recognition results while the sequential insertion process is within the OBJECTIVE super-section. It is further noted that common misrecognition errors can be included as a trigger pattern. The word "objected," for example, is a common misrecognition for the word "objective" in results from speech recognition processing. It is noted that the navigation triggers, the dictionary entries, the processing rules and other aspects of this dictionary in TABLE 3 could be modified and configured, as desired, to achieve the results desired. The tables above should be considered as non-limiting examples only.

TABLE 4 below provides contents for a sample automated speech recognition (ASR) results file. This example file represents speech information that could be dictated by a doctor, Dr. Smith, after examination a patient, John Doe. The information dictated would be stored for later transcription. This speech information can also be subjected to speech recognition processing to produce a results file that includes text representing the dictated speech information. The example text in TABLE 4 is intended to represent the results of this ASR process.

TABLE 4

Example of ASR Results
ASR Results File Content

Dr. Smith dictating an office note on patient John Doe medical record number 1234 NewLine subjective the patient comes in today to follow up on high blood pressure period objected patient appears well blood pressure 120/80 patient is afebrile opinion evaluation hypertension comma patient to continue current medications number two allergies comma prescription given for Allergra TABLE 5 below provides an example for the processing performed on the ASR results file of TABLE 4 by the automated sequential insertion subsystem 700 using a formed template including an embedded dictionary with related processing rules. As shown in the example below, the auto-fill sequential insertion process analyzes the speech recognition results as it is sequentially inserted into the document, positions inserted text at appropriate places in the document, applies processing rules, and produces a properly formatted document as the resultant data file. As discussed above, the auto-fill operation can be dependent upon document templates and algorithms for determining how to auto-fill the document. In addition, formed document templates with embedded dictionaries and related processing rules can be used to accomplish the automated sequential insertion processing.

TABLE 5

Example Sequential Insertion Processing Utilizing a Formed Document Template

| Speech Recognition Results | Action Taken with Automated Processing | Contents of Final Document |
|---|---|---|
| Dr. Smith dictating an office note on patient John | Results begin to be sequentially inserted into template starting at initial insertion point before first | Central Medical Associates<br>Austin, TX<br>Phone: 123-4567<br>OFFICE NOTE |

TABLE 5-continued

Example Sequential Insertion Processing Utilizing a Formed Document Template

| Speech Recognition Results | Action Taken with Automated Processing | Contents of Final Document |
|---|---|---|
| Doe medical record number 1234 | body section. | Patient Name:<br>MRN:<br>Dr. Smith dictating an office note on patient John Doe medical record number 1234<br>SUBJ:<br>OBJ: BP: Temp:<br>OPINION AND EVAL:<br>1.<br><br>———————<br>Wanda M. Test, M.D.<br>WMT/abc<br>cc: |
| NewLine subjective the patient comes in today to follow up on high | Trigger phrase "NewLine subjective" encountered; context and other restrictions are validated; navigation takes place to the SUBJECTIVE position or insertion point in the document. To avoid repetition, printing of the trigger words is suppressed. Capitalization is corrected and speech recognition results continue to be inserted from this insertion point location forward. | Central Medical Associates<br>Austin, TX<br>Phone: 123-4567<br>OFFICE NOTE<br><br>Patient Name:<br>MRN:<br>Dr. Smith dictating an office note on patient John Doe medical record number 1234<br>SUBJ: The patient comes in today to follow up on high<br><br>OBJ: BP: Temp:<br><br>OPINION AND EVAL:<br>1.<br><br>———————<br>Wanda M. Test, M.D.<br>WMT/abc<br>cc: |
| blood pressure | Trigger phrase "blood pressure" encountered. However, this trigger is restricted to the context of the OBJECTIVE section. Since context restriction is not met, navigation to the BP insertion point does not occur, and speech recognition results continue streaming in at current location. | Central Medical Associates<br>Austin, TX<br>Phone: 123-4567<br>OFFICE NOTE<br><br>Patient Name:<br>MRN:<br>Dr. Smith dictating an office note on patient John Doe medical record number 1234<br>SUBJ: The patient comes in today to follow up on high blood pressure<br><br>OBJ: BP: Temp:<br>OPINION AND EVAL:<br>1.<br><br>———————<br>Wanda M. Test, M.D.<br>WMT/abc<br>cc: |
| objected patient appears well | "Objected" (common misrecognition of "objective") identified as trigger for OBJECTIVE. Since current location is SUBJECTIVE, context requirements are met and navigation occurs to new insertion point after OBJECTIVE. Printing of the trigger word is suppressed, capitalization and punctuation are corrected, and speech recognition results continue to stream in. | Central Medical Associates<br>Austin, TX<br>Phone: 123-4567<br>OFFICE NOTE<br><br>Patient Name:<br>MRN:<br>Dr. Smith dictating an office note on patient John Doe medical record number 1234<br>SUBJ: The patient comes in today to follow up on high blood pressure.<br><br>OBJ: Patient appears well BP: Temp:<br><br>OPINION AND EVAL:<br>1.<br><br>———————<br>Wanda M. Test, M.D.<br>WMT/abc<br>cc: |

TABLE 5-continued

Example Sequential Insertion Processing Utilizing a Formed Document Template

| Speech Recognition Results | Action Taken with Automated Processing | Contents of Final Document |
|---|---|---|
| blood pressure 120/80 | Trigger phrase "blood pressure" encountered again. Insertion point is now in OBJECTIVE section so context requirements are met. Navigation occurs to the insertion point for the BLOOD PRESSURE section. Printing of trigger words is suppressed, formatting is corrected, and ASR results continue to stream in from this location. | Central Medical Associates<br>Austin, TX<br>Phone: 123-4567<br>OFFICE NOTE<br><br>Patient Name:<br>MRN:<br>Dr. Smith dictating an office note on patient John Doe medical record number 1234<br>SUBJ: The patient comes in today to follow up on high blood pressure.<br><br>OBJ: Patient appears well. BP: 120/80. Temp:<br><br>OPINION AND EVAL:<br>1.<br><br>_____<br>Wanda M. Test, M.D.<br>WMT/abc<br>cc: |
| patient is afebrile | Trigger phrase "patient is afebrile" is identified and context restrictions are tested. Current location in BLOOD PRESSURE section is part of OBJECTIVE so context restrictions are met. Navigation occurs to the insertion point location following TEMPERATURE. For this trigger, printing is not suppressed and the trigger words print out after navigation. Formatting is corrected. | Central Medical Associates<br>Austin, TX<br>Phone: 123-4567<br>OFFICE NOTE<br><br>Patient Name:<br>MRN:<br>Dr. Smith dictating an office note on patient John Doe medical record number 1234<br>SUBJ: The patient comes in today to follow up on high blood pressure.<br><br>OBJ: Patient appears well. BP: 120/80. Temp: Patient is afebrile.<br><br>OPINION AND EVAL:<br>1.<br><br>_____<br>Wanda M. Test, M.D.<br>WMT/abc<br>cc: |
| opinion evaluation hypertension comma patient to continue current medications | Trigger phrase "opinion evaluation" identified, context requirements met, navigation occurs to an insertion point associated with the OPINION AND EVAL section. Because template has been configured to have numbered lists in this section, text is automatically inserted in a numbered list. Printing of trigger words is suppressed. Formatting is corrected, and ASR results continue to stream in. | Central Medical Associates<br>Austin, TX<br>Phone: 123-4567<br>OFFICE NOTE<br><br>Patient Name:<br>MRN:<br>Dr. Smith dictating an office note on patient John Doe medical record number 1234<br>SUBJ: The patient comes in today to follow up on high blood pressure.<br><br>OBJ: Patient appears well. BP: 120/80. Temp: Patient is afebrile.<br><br>OPINION AND EVAL:<br>1. Hypertension, patient to continue current medications.<br><br>_____<br>Wanda M. Test, M.D.<br>WMT/abc<br>cc: |
| number two allergies comma prescription given for Allergra | Keywords "number two" identified in numbered list. Numbering increments and results continue to stream in. Formatting is corrected. | Central Medical Associates<br>Austin, TX<br>Phone: 123-4567<br>OFFICE NOTE<br><br>Patient Name:<br>MRN:<br>Dr. Smith dictating an office note on patient John Doe medical record number 1234 |

TABLE 5-continued

Example Sequential Insertion Processing Utilizing a Formed Document Template

| Speech Recognition Results | Action Taken with Automated Processing | Contents of Final Document |
|---|---|---|
| | | SUBJ: The patient comes in today to follow up on high blood pressure.<br>OBJ: Patient appears well. BP: 120/80. Temp: Patient is afebrile.<br>OPINION AND EVAL:<br>1. Hypertension, patient to continue current medications.<br>2. Allergies, prescription given for Allegra.<br><br>Wanda M. Test, M.D.<br>WMT/abc<br>cc: |
| | End of dictation reached. Speech recognition results for header data optionally deleted so header sections can be filled in by lookup, if desired. | Central Medical Associates<br>Austin, TX<br>Phone: 123-4567<br>OFFICE NOTE<br><br>Patient Name:<br>MRN:<br>SUBJ: The patient comes in today to follow up on high blood pressure.<br>OBJ: Patient appears well. BP: 120/80. Temp: Patient is afebrile.<br>OPINION AND EVAL:<br>1. Hypertension, patient to continue current medications.<br>2. Allergies, prescription given for Allegra.<br><br>Wanda M. Test, M.D.<br>WMT/abc<br>cc: |

The processing set forth in TABLE 5 provides an example of how a formed document template with its embedded dictionary and related processing rules can be used in the automated sequential insertion process. The embedded dictionary includes tags that provide insertion points within the template and triggers that can be identified within the ASR results to indicate that text should be placed at that insertion point. In addition, the dictionary can contain processing rules that can define conditions and actions, including context, section family, pre-text, text and post-text processing rules. It is seen, therefore, that the formed document template facilitates the sequential insertion processing accomplished by the sequential insertion subsystem 700. The processing rules define actions that are taken in response to recognized text strings within the ASR results, and the text strings are recognized through the use of the dictionary, its entries, aliases, triggers, settings, and processing rules. The end result is a resultant data file including speech recognition results inserted into appropriate locations within a document template. It is noted in the last row of TABLE 5 that the header data can be automatically deleted, if desired. This header data can be later added through the use of an automated look-up process tied to the patient number or some other data identifying the record being generated.

In the discussion above, it is typically assumed that the text of the template is fixed. In a variation of the present invention, however, the template can be configured to contain the structure necessary to dynamically build the final document, and this text could be configured to appear only if triggered by the speech recognition results. For example, the dictator might say, "subjective the patient presents with . . . " The template is configured to specify that the word "subjective" (if triggered) should be bold followed by a ":" with the next word capitalized, so it would insert "SUBJECTIVE: The patient presents with . . . " into the final document. If the term "subjective" or relate alias is not utilized in the speech recognition results, however, the "SUBJECTIVE:" subject heading is not included in the result document. Similarly, the dictator might dictate, "vital signs temperature 98 degrees weight 150 blood pressure 130 over 80." The structure specified for the template is configured to take this information and output: "VITAL SIGNS: T: 98° W: 150 lbs BP: 130/80". In this way, a formatted template is built dynamically dependent on what the dictator actually says. The template can be defined such that only those sections that are actually dictated appear in the final document. In addition, if desired, the ordering of the sections within the final formatted document could be dependent on the order that the sections are dictated, or the results could be reordered as specified in the template, its dictionary and related processing rules.

In addition, instead of relying on a fixed set of triggers in a data dictionary, the triggers for a template/dictator could be dynamically derived from comparison of the speech recognition results with a manually edited version of the transcription(s). For example, in the manually edited document, it is noted that when the dictator says "hemoglobin" the results are always placed in the "LABORATORY" section of the template. By running an analysis of the speech recognition results as compared to the final document, it is determined that the word "hemoglobin" should be added as a trigger for the "LABORATORY" section for the template and/or dictator. Furthermore, triggers can contain pattern-matching logic instead of requiring an exact text match. For example, a trigger could be defined as "temperature * degrees" where the "*" denotes a "wild card" that can match one or more words or characters. If the dictator says "temperature 98 degrees", this trigger will fire even though "98" is not explicitly defined in the trigger. It is instead included within the wildcard definition.

It is further noted that dictionaries can be automatically generated by running a set of completed transcriptions or templates through an analyzer that determines the structure of the documents and creates corresponding sections in the data dictionary. By running the corresponding speech recognition results for each transcription through the analyzer, triggers could be automatically determined for each section and added to the dictionary. For example, it could be noted that whenever the dictator states "the patient presents with", the accompanying text is placed in the "Chief Complaint" section, indicating that the phrase "the patient presents with" should be a trigger for "Chief Complaint". This trigger would then be added to the dictionary as a trigger for the Chief Complaint section.

Further modifications and alternative embodiments of this invention will be apparent to those skilled in the art in view of this description. It will be recognized, therefore, that the present invention is not limited by the examples provided above. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A computer-implemented method comprising:
   receiving a digital file having textual data;
   applying, by a processor, processing rules to the data to cause portions of the textual data to be inserted into an electronic document template having a plurality of insertion points, wherein applying the processing rules comprises comparing phrases encountered in the textual data to trigger phrases that, when encountered in the textual data and determined to be valid, cause subsequently encountered portions of the textual data to be inserted at pre-defined insertion points in the electronic document template, and wherein determined to be valid comprises applying rules associated with the insertion points that define conditions which must be met for the trigger phrases to be valid, and wherein the defined conditions include at least a first trigger phrase that when encountered while inserting text into a first insertion point, will cause subsequently encountered portions of the textual data to be continued to be inserted in the first insertion point, and that, when encountered while inserting text into a second insertion point that is different than the first insertion point, will cause subsequently encountered portions of the textual data to be inserted in a third insertion point that is different than the second insertion point.

2. The method of claim 1, wherein applying the processing rules produces a resultant data file, said resultant data file comprising at least a portion of textual data formatted according to the document template.

3. The method of claim 1, wherein the textual data comprises speech recognition results obtained through speech recognition processing on speech information.

4. The method of claim 1, wherein the textual data comprises speech recognition results obtained through manual transcription of speech information.

5. The method of claim 4, wherein at least one of the insertion points defined by the electronic document template has at least two trigger words or phrases associated with it.

6. The method of claim 1, wherein the trigger phrases are not themselves inserted into the electronic document template.

7. The method of claim 6, wherein information defining the plurality of insertion points includes information defining at least one relationship to another insertion point.

8. The method of claim 1, wherein the document template further comprises formatting information defining formatting to be applied to text inserted at particular insertion points.

9. A computer system comprising:
   a processor and memory;
   a first module operative to receive textual data having at least a first portion and a second portion;
   a template database operative to provide an electronic document template, the electronic document template having rules defining at least both:
   (a) a first and a second insertion points in an electronic document template, and at least one trigger for each respective insertion point, the trigger being a phrase that, if valid, causes insertion of subsequently encountered data to proceed at the respective insertion point, and wherein at least one of the insertion points includes validity conditions of a first trigger phrase such that, when encountered while inserting text into the first insertion point, will cause subsequently encountered portions of the textual data to be continued to be inserted in the first insertion point, and that, when encountered while inserting text into the second insertion point that is different than the first insertion point, will cause subsequently encountered portions of the textual data to be inserted in a third insertion point that is different than the second insertion, and
   (b) a context associated with at least one insertion point that defines conditions which must be met for triggers to be valid; and
   a template processor module operative to apply the rules defined within the electronic document template against the first portion, and based on the application of the set rules, insert the first portion at a position in the electronic document template associated with the first insertion point.

10. The computer system of claim 9, wherein the template processor additionally applies the rules defined within the electronic document template against the second portion, and based on the application of the set of rules, inserts the second portion at a position in the electronic document template associated with the second insertion point.

11. The computer system of claim 10, wherein the rules provided by the electronic document template includes, for at least one of the first or second insertion points, at least two triggers.

12. The computer system of claim 11, wherein the triggers comprise words or phrases.

13. The computer system of claim 11, wherein the template processor, upon application of the rules, outputs an electronic document based on the electronic document template.

14. The computer system of claim 11, wherein the textual data comprises speech recognition results obtained through automatic recognition or manual recognition of speech information.

15. The computer system of claim 14, wherein the rules provided by the electronic template includes additionally information defining at least one relationship between the first and the second insertion points.

16. The computer system of claim 14, wherein the rules provided by the electronic template includes additional formatting information that defines formatting to be applied to portions inserted at the first or second insertion point.

17. A computer-implemented method for filling in an electronic form, comprising:
- receiving textual data comprising text to be inserted into the electronic form, the textual data including a plurality of phrases, each comprised of one or more words;
- applying, by a processor, rules to the textual data, the rules defining:
  - (a) a plurality of contexts which define whether the insertion of text should move to pre-defined points in the electronic form when valid trigger phrases are encountered while inserting textual data at particular insertion points, rather than the trigger phrases being inserted in the document, and wherein the plurality of contexts include at least one context that defines the validity conditions of a first trigger phrase such that, when encountered while inserting text into a first insertion point, will cause subsequently encountered portions of the textual data to be continued to be inserted in the first insertion point, and that, when encountered while inserting text into a second insertion point that is different than the first insertion point, will cause subsequently encountered portions of the textual data to be inserted in a third insertion point that is different than the second insertion point, and
  - (b) trigger phrases that are valid within the plurality of contexts; and
- filling in the electronic form with at least some of the textual data, based on the rules.

* * * * *